(12) United States Patent
Adjakple et al.

(10) Patent No.: US 12,538,165 B2
(45) Date of Patent: Jan. 27, 2026

(54) EFFICIENT BUFFER MANAGEMENT IN MULTI-HOPS DATA FORWARDING

(71) Applicant: InterDigital Patent Holdings, Inc., Wilmington, DE (US)

(72) Inventors: Pascal M. Adjakple, Great Neck, NY (US); Stephen E. Terry, Northport, NY (US); Guodong Zhang, Woodbury, NY (US); Joseph M. Murray, Schwenksville, PA (US); Qing Li, Princeton Junction, NJ (US); Mohamed Awadin, Plymouth Meeting, PA (US); Yifan Li, Conshohocken, PA (US); Allan Y. Tsai, Boonton, NY (US); Lakshmi R. Iyer, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/253,173

(22) PCT Filed: Jun. 20, 2019

(86) PCT No.: PCT/US2019/038156
§ 371 (c)(1),
(2) Date: Dec. 17, 2020

(87) PCT Pub. No.: WO2019/246350
PCT Pub. Date: Dec. 26, 2019

(65) Prior Publication Data
US 2021/0282050 A1    Sep. 9, 2021

Related U.S. Application Data

(60) Provisional application No. 62/687,501, filed on Jun. 20, 2018, provisional application No. 62/736,807, filed on Sep. 26, 2018.

(51) Int. Cl.
*H04L 47/10*     (2022.01)
*H04L 1/1867*    (2023.01)
(Continued)

(52) U.S. Cl.
CPC ....... *H04W 28/0273* (2013.01); *H04L 1/1874* (2013.01); *H04L 1/1896* (2013.01); *H04W 28/06* (2013.01); *H04W 88/14* (2013.01)

(58) Field of Classification Search
None
See application file for complete search history.

(56) References Cited

U.S. PATENT DOCUMENTS 10,708,189 B1 *  7/2020  Agrawal ............. H04L 49/3009
10,735,331 B1 *  8/2020  Li ....................... H04L 47/2458
(Continued)

FOREIGN PATENT DOCUMENTS

CN   103220722 A    7/2013
EP     1989852 A1   11/2008
(Continued)

OTHER PUBLICATIONS

OPPO: "Discussion on User Plane for IAB", 3GPP Draft; R2-1806693—Discussion on User Plane for IAB, 3rd Generation Partnership Project (3GPP), Mobile Competence Centre ; 650, Route Des Lucioles ; F-06921 Sophia-Antipolis Cedex; France, vol. RAN WG2, No. Busan, Korea; May 21, 2018-May 25, 2018 (May 11, 2018), XP051464369, Retrieved from the Internet: URL:http://www.3gpp.org/ftp/tsg%5Fran/WG2%5FRL2/TSGR2%5F102/Docs [retrieved on May 11, 2018].
(Continued)

*Primary Examiner* — Willie J Daniel, Jr.
(74) *Attorney, Agent, or Firm* — Flaster Greenberg, P.C.

(57) ABSTRACT

Current approaches to radio link control (RLC) data forwarding with no end-to-end RLC entities between a given
(Continued)

UE and IAB donor node lack proper buffer management. In various examples, the premature deletion of transmitted PDCP PDUs is avoided. Various embodiments also address buffer size control, for example end-to-end flow control, hot-by-hop flow control, explicit and implicit flow control options are described. Content of flow control messages, transmitter actions at the reception of flow control, and triggers for flow controls are also described herein.

18 Claims, 16 Drawing Sheets

(51) Int. Cl.
  *H04W 28/02* (2009.01)
  *H04W 28/06* (2009.01)
  *H04W 88/14* (2009.01)

(56) References Cited

U.S. PATENT DOCUMENTS

| | | |
|---|---|---|
| 2008/0317017 A1 | 12/2008 | Wiemann et al. |
| 2009/0154356 A1 | 6/2009 | Wiemann et al. |
| 2011/0090793 A1 | 4/2011 | Halfmann et al. |
| 2014/0362695 A1 | 12/2014 | Ho et al. |
| 2020/0359356 A1* | 11/2020 | Sirotkin ............... H04W 80/08 |
| 2021/0007011 A1* | 1/2021 | Zhu .................... H04B 7/15542 |

FOREIGN PATENT DOCUMENTS

| | | |
|---|---|---|
| EP | 2055133 A2 | 5/2009 |
| GB | 0616682 A | 1/1949 |
| JP | 2012-016052 A | 1/2012 |
| WO | 2006/024320 A1 | 3/2006 |
| WO | 2007/095967 A1 | 8/2007 |
| WO | 2008/023814 A2 | 2/2008 |
| WO | 2011/070308 A1 | 6/2011 |
| WO | 2017/182927 A1 | 10/2017 |

OTHER PUBLICATIONS

Ohta et al., "Evaluation of Packet-Forwarding Scheme on TCP-Transmission Performance in Intra-Evolved UTRAN Handover", IEICE Technical Report, vol. 106, No. 578, Mar. 1, 2007, pp. 303-208. (English Abstract Available).

Qualcomm Incorporated, "AB—U-plane transport for L2-relaying", 3GPP TSG-RAN WG3 Meeting #99bis, Apr. 2018, R3-181945, pp. 12.

Third Generation Partnership Project (3GPP), "Study on Integrated Access and Backhaul", Technical Specification Group Radio Access Network, Release 15, 3GPP TR 38.874 V0.2.1, May 2018, 19 pages.

* cited by examiner

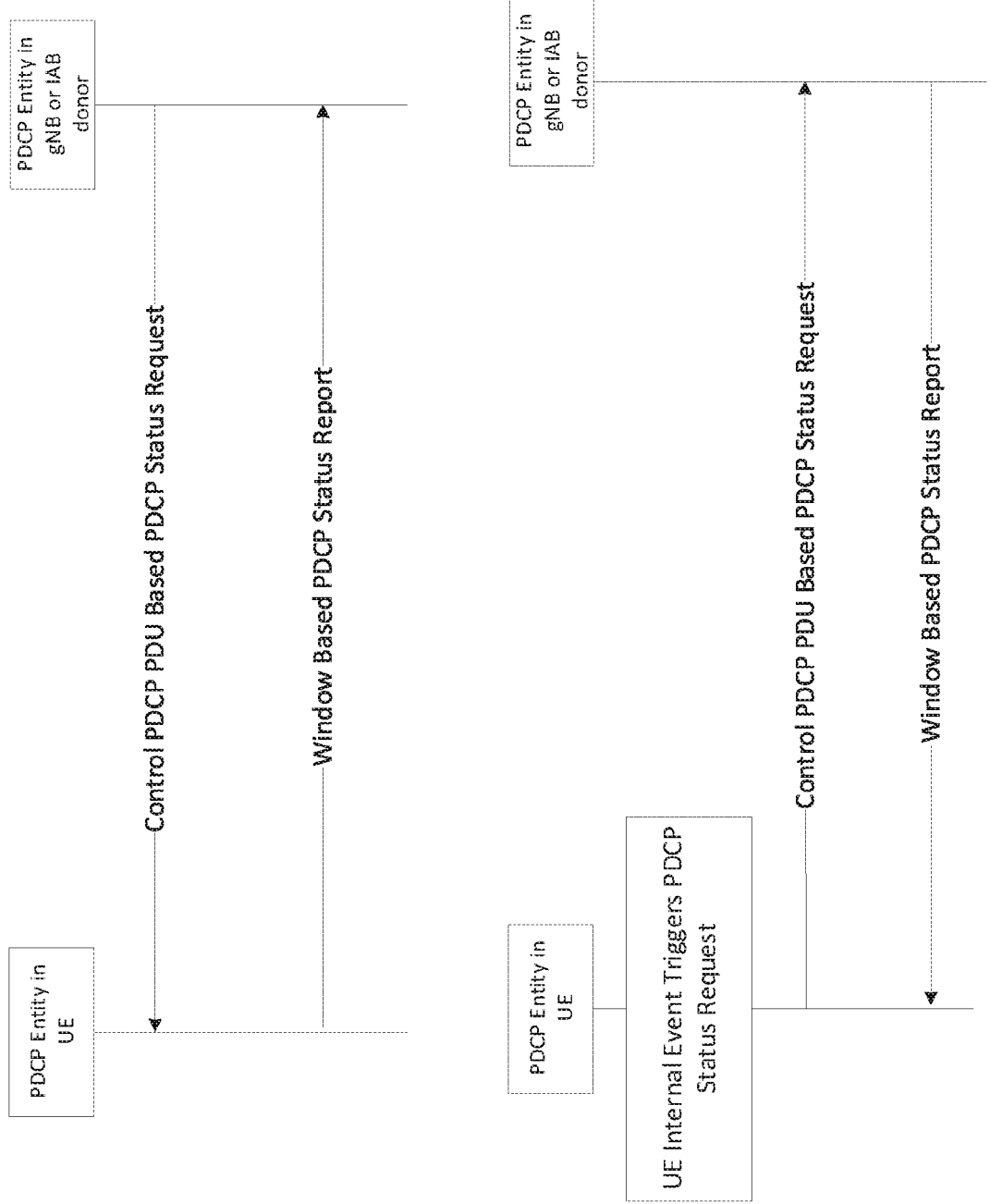

EFFICIENT BUFFER MANAGEMENT IN MULTI-HOPS DATA FORWARDING

CROSS-REFERENCE TO RELATED APPLICATIONS

This application is the National Stage of International Patent Application No. PCT/US2019/038156, filed Jun. 20, 2019, which claims the benefit of, and priority to, U.S. Provisional Patent Application No. 62/687,501, filed Jun. 20, 2018, and U.S. Provisional Patent Application No. 62/736,807, filed Sep. 26, 2018, the disclosures of which are hereby incorporated by reference as if set forth in their entireties.

BACKGROUND

In support of multi-hop backhauling in new radio (NR), the hop-by-hop data forwarding architectures shown in FIGS. 1-3 are being considered. An Integrated Access and Backhaul (IAB) node (IAB-node) is a radio access network (RAN) node that supports wireless access to user equipments (UEs) and wirelessly backhauls the access traffic. An IAB-donor node is a RAN node that provides a given UE's interface to the core network and wireless backhauling functionality to IAB nodes. Current approaches to radio link control (RLC) data forwarding with no end-to-end peer RLC entities between a given UE and IAB donor node lack proper buffer management.

SUMMARY

In various examples, the premature deletion of transmitted PDCP PDUs is avoided. Various embodiments include PDCP acknowledgment, including new triggering conditions for PDCP acknowledgment. Similarly, multiple embodiments of PDCP acknowledgement include polling bit triggered re-ordering window-based PDCP status reports, RRC triggered or event triggered one shot or periodic window based PDCP status reports, PDCP Control PDU triggered one shot or periodic window based PDCP status reports, and RRC triggered or event based triggered ACK/NACK of each PDCP PDU. In other examples, RLC Acknowledgments are relayed between a final destination receiver (e.g., UE) and a source transmitter (e.g., IAB donor node or gNB). In another example, an end-to-end acknowledgement procedure is introduced between the IAB node connected to the UE and the IAB Donor node. Furthermore, changes to the behavior of PDCP, for example ignoring acknowledgments from the RLC layer, are described. Various embodiments also address buffer size control, for example end-to-end flow control, hot-by-hop flow control, and explicit and implicit flow control options are introduced. Content of flow control messages, transmitter actions at the reception of flow control, and triggers for flow controls are also described.

In an example aspect, an apparatus can receive a packet data convergence protocol (PDCP) protocol data unit (PDU) from an intermediary node. The PDCP PDU can be sent from an Integrated Access and Backhaul (LAB) node through the intermediary node. Based on a trigger or a status request, the apparatus can generate a PDCP status report, and send the PDCP status report to the Integrated Access and Backhaul (LAB) node. The PDCP status report can indicate an acknowledgement of the PDCP PDU received by the apparatus. In response to receiving the PDCP status report, the PDCP transmitter that sent PDCP PDU can delete the PDCP PDU from its buffer.

In another aspect, a PDCP transmitter sends to a first intermediary node, a PDCP PDU intended for a PDCP receiver. The PDCP transmitter saves the PDCP PDU in a buffer after the PDCP PDU is sent to the first intermediary node. The PDCP transmitter receives an acknowledgement that indicates that the PDCP PDU is received by the PDCP receiver. In response to the acknowledgement, the PDCP transmitter deletes the PDCP PDU from the buffer. The PDCP transmitter can receive an indication that the PDCP PDU was received by the first intermediary node, and can maintain the PDCP PDU in the buffer after receiving the indication that the PDCP PDU was received by the intermediary node. In an example, the acknowledgement is sent from a second intermediary node connected between the first intermediate node and the PDCP receiver.

In yet another aspect, an apparatus can receive a flow control feedback message from an intermediary node, wherein the intermediary node is connected between the apparatus and an end node uplink from the apparatus in the network, such that data sent to the apparatus from the end node travels through the intermediary node. Based on the flow control feedback message, the apparatus can send a flow control message to the end node or can select a new route for data to be sent downlink from the end node to the apparatus. The flow control feedback message may indicates an explicit flow control request, and the flow control message may include an indication for the end node to stop transmitting data, start transmitting data, increase its data transmission rate, decrease its data transmission rate, and/or transmit data at a new rate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended to only to be illustrative.

FIG. 8 is a call flow for PDCP control Protocol Data Unit (PDU) based PCDP status reporting to a gNB or IAB donor node, in accordance with an example embodiment.

FIG. 9 is a call flow for PDCP control PDU based PCDP status reporting to a UE, in accordance with an example embodiment.

DETAILED DESCRIPTION

Figure 1:
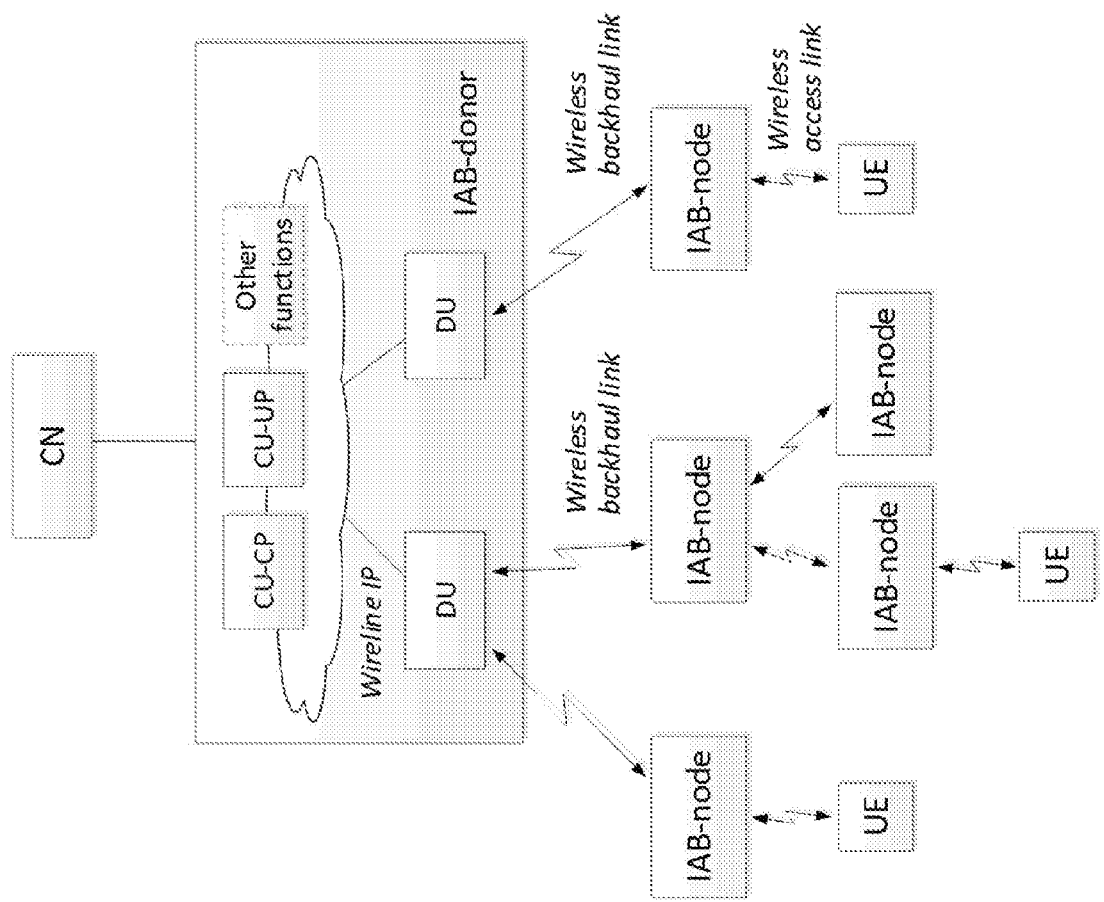
FIG. 1 depicts an example reference architecture for Integrated Access and Backhaul (IAB).
Figure 2:
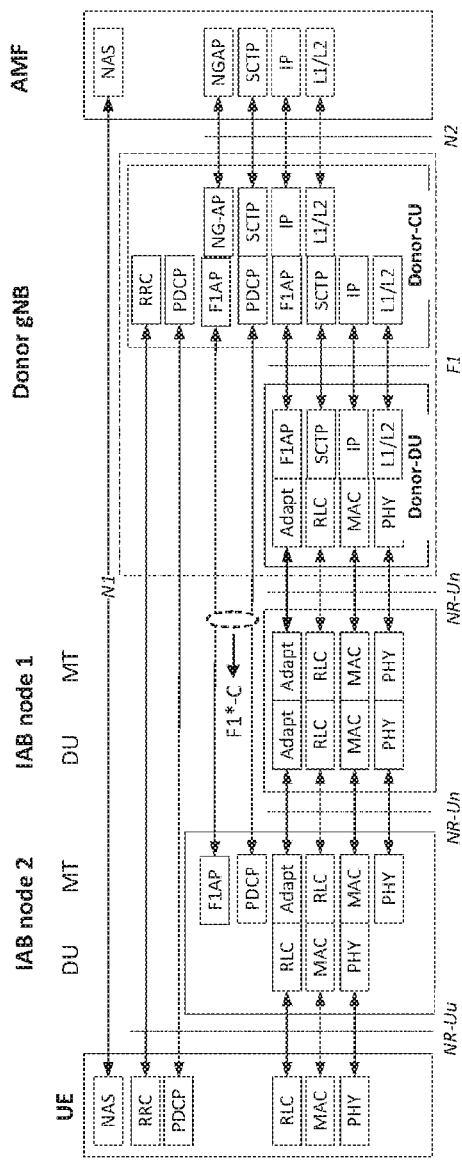
FIG. 2 depicts an example control plane protocol stack for Layer 2 (L2) relaying.
Figure 3:
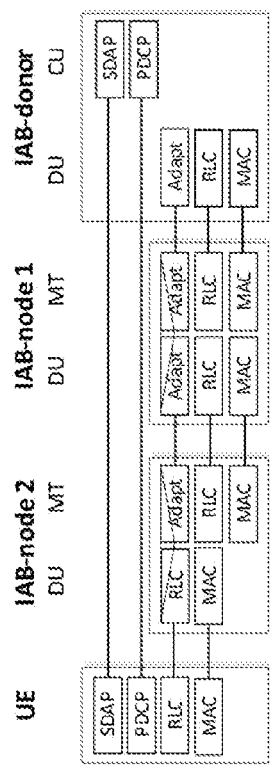
FIG. 3 depicts an example user plane protocol stack for Layer 2 (L2) relaying.

As described above, it is recognized herein that current approaches to radio link control (RLC) data forwarding with no end-to-end peer RLC entities between a given user equipment (UE) and Integrated Access and Backhaul (IAB) donor node lack proper buffer management. Various issues related to current approaches are recognized herein. For example, current approaches may have an inability to support lossless handover. Continuing with the example, the transmitting Packet Data Convergence Protocol (PDCP) entity may need to buffer data until delivered to the PDCP receiver, in order to support lossless handover where the PDCP layer is reset. Therefore, the RLC ACK may be used by the PDCP transmitter (in the UE) to delete transmitted Protocol Data Units (PDUs) and minimize UE buffering requirements. In absence of end-to-end RLC Acknowledgment (ACK), it is recognized here that current approaches lack support of lossless handover that ensures transmitted PDCP PDUs are not prematurely deleted while minimizing UE buffering requirements.

Without proper buffer management, it is recognized herein that there may be a risk of unnecessary forwarding of large amounts of data to parent IAB nodes or target IAB during handover, leading to potential long data interruption time. Without proper buffer management, it is further recognized herein that end-to-end latency between a given UE and a donor IAB node is likely to be unnecessarily larger than the available latency budget derived from the service end-to-end delay, for example, as a result of packets being dropped. Furthermore, without proper buffer management, the likelihood of buffer overflow at IAB node may be high, which may lead to unnecessary retransmissions over the backhaul and inefficient usage of radio resources and available access link and backhaul bandwidth. Without proper buffer management, it is further recognized herein that IAB nodes may be starved, which may leading to a waste of downlink or uplink transmission opportunities and resources on the radio interface. Without proper buffer management, it is further recognized herein that the buffers at the IAB nodes may be unnecessarily very large, with possible consequence of unnecessary increase in UE cost and IAB node cost (e.g., larger SDRAM memory), and possibly larger power consumption/power dissipation. To exploit multi-user diversity, in some cases, LAB nodes may have data for as many users as possible. It is recognized herein that the availability of data meant for multiple users can improve the throughput of the air interface link between IAB and UEs. Further, proper buffer management can be used to improve timely availability of data at the IAB nodes.

In various examples, the premature deletion of transmitted PDCP PDUs is avoided. Various embodiments include PDCP acknowledgment, including new triggering conditions for PDCP acknowledgment. Similarly, multiple embodiments of PDCP acknowledgement include polling bit triggered re-ordering window-based PDCP status reports, RRC triggered or event triggered one shot or periodic window based PDCP status reports, PDCP Control PDU triggered one shot or periodic window based PDCP status reports, and RRC triggered or event based triggered ACK/NACK of each PDCP PDU. In other examples, RLC Acknowledgments are relayed between a final destination receiver (e.g., UE) and a source transmitter (e.g., IAB donor node or gNB). In another example, end-to-end acknowledgement procedure is introduced between the LAB node connected to the UE and the IAB Donor node. Furthermore, changes to the behavior of PDCP, for example ignoring acknowledgments from the RLC layer, are described. Various embodiments also address buffer size control, for example, end-to-end flow control, hop-by-hop flow control, explicit and implicit flow control options are introduced. Content of flow control message, transmitter actions at the reception of flow control and triggers for flow controls are also described.

With respect to PDCP acknowledgement, for a multi-hop IAB network, in order to avoid premature deletion of transmitted PDCP PDUs at the PDCP transmitter, in an example, the PDCP receiver acknowledges received PDCP PDUs. The PDCP acknowledgment may be in the form of a single PDCP PDU acknowledgment or alternatively may be in the form of a more extended status report that includes, for example, an ACK (positive ACK) or a NACK (negative ACK) for a bundle of PDCP PDUs based on a reception window (e.g., re-ordering window) maintained by the receiver side of the PDCP entity. For example, such a PDCP acknowledgement can be similar to the existing PDCP Status Report, where a bitmap is used by the receiver side of a PDCP entity to transmit the ACK or NACK status of a set of PDCP PDUs. As used herein, PDCP acknowledgment and PDCP status report can be used interchangeably, without limitation, unless explicitly stated otherwise. Similarly, the term "acknowledgment" may be used in reference to an ACK or NACK unless explicitly stated otherwise. Unless otherwise specified, PDCP acknowledgement procedures described herein may apply to both uplink and downlink transmissions. Further, unless otherwise specified, procedures described herein for PDCP acknowledgement generation and for PDCP acknowledgement reception apply to the UE, gNB or an IAB node. In some cases, PDCP acknowledgement procedures may be between any pair of IAB nodes, for example, between the IAB donor node and the IAB node directly connected to the UE.

PDCP acknowledgment may be enabled or disabled by RRC signaling. The upper layers may configure for each Acknowledged Mode (AM) Data Radio Bearer (DRB) or Unacknowledged Mode (UM) DRB, and Signal Radio Bearers (SRBs), whether or not the corresponding PDCP entity should send a PDCP acknowledgment to the PDCP peer entity for received PDCP PDU(s), and whether the receiving PDCP should manage buffered transmission PDUs based on PDCP acknowledgements. For example, the upper layer may configure for each DRB in the UE, whether or not the corresponding PDCP entity in the UE should send PDCP acknowledgment in the uplink, and/or whether or not the corresponding PDCP entity in the UE should manage buffered transmission PDUs based on PDCP acknowledgement in the downlink. For AM DRBs or UM DRBs configured by upper layers to send a PDCP acknowledgment, the receiving PDCP entity may trigger PDCP acknowledgment when, for example, the UE receives a handover or route update command. For example, an RRC Reconfiguration message may include a Mobility Control Information element, and the upper layer within the UE may request that the PDCP entity generate a PDCP acknowledgment.

Figure 6:
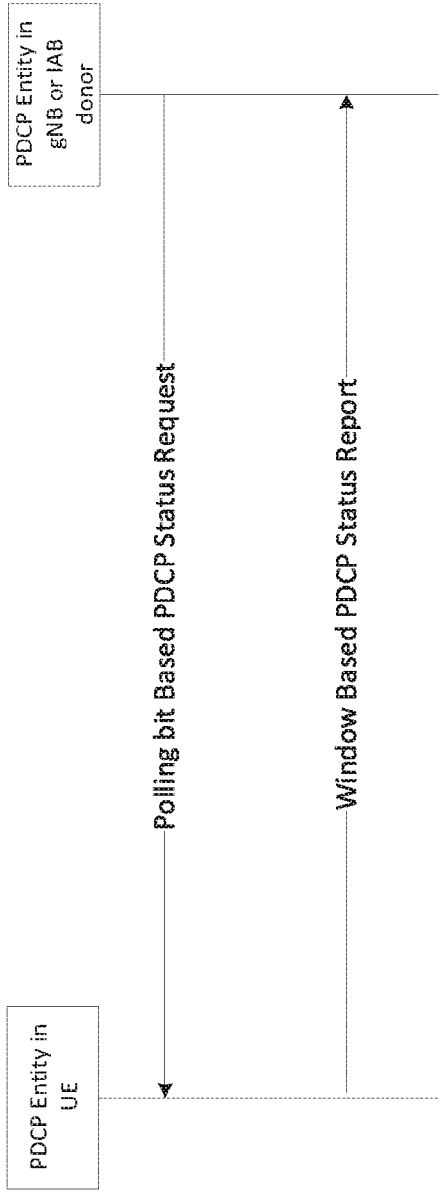
FIG. 6 is a call flow for polling bit based PDCP status reporting to a gNB or IAB donor node, in accordance with an example embodiment.
Figure 7:
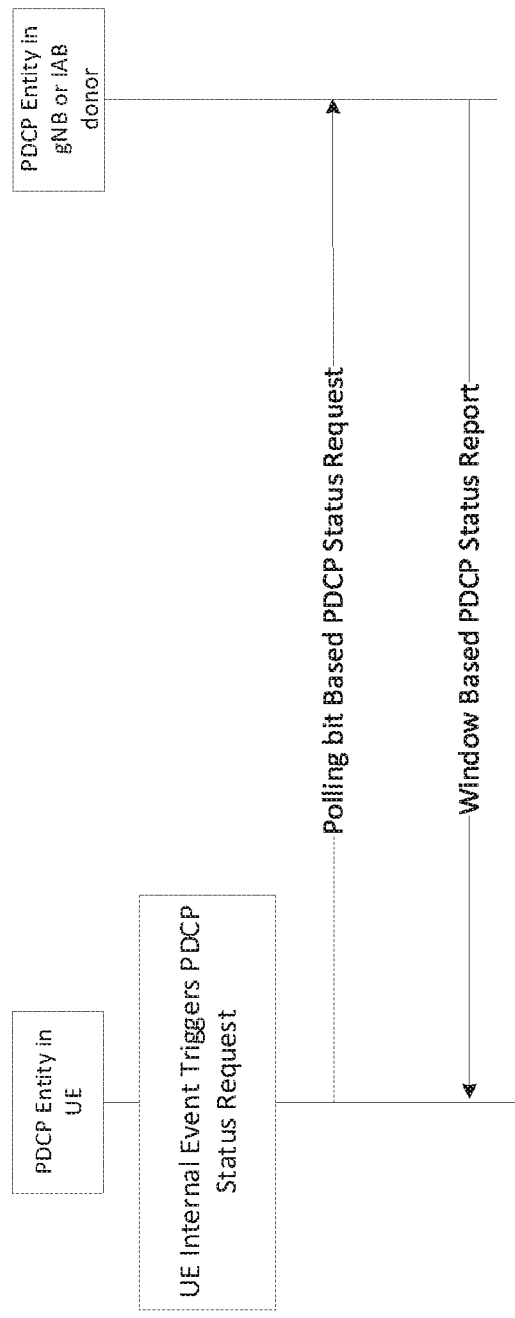
FIG. 7 is a call flow for polling bit based PDCP status reporting to a UE, in accordance with an example embodiment.

The receiving PDCP entity may also trigger PDCP acknowledgment when, for example, the receiving side of the PDCP entity receives a request from a transmitting side of the PDCP peer entity, to send PDCP Acknowledgment. The request may be in-band within the user plane or out-of-band within the control plane. In a user plane in-band signaling example, the request may be in the form of a polling bit (e.g., see FIGS. 6 and 7). A PDCP entity can poll its peer PDCP entity to trigger Acknowledgment reporting at the peer PDCP entity. The polling bit may be specified as part of the PDCP header. In an example, a value of 1 for the polling means PDCP acknowledgment is requested. A value of 0 for the polling bit may mean PDCP acknowledgment is not requested, or transmission of PDCP acknowledgment can be stopped. Alternatively, a PDCP control PDU designed specifically for the request of PDCP acknowledgment may be used (e.g., see FIGS. 8 and 9). In another alternative, such a request may use out-of-band signaling (e.g., control pane signaling such as RRC signaling). For example, a handover or route update command may carry an explicit request for a receiver PDCP entity to transmit PDCP acknowledgment or start transmission of PDCP acknowledgment.

Figure 10:
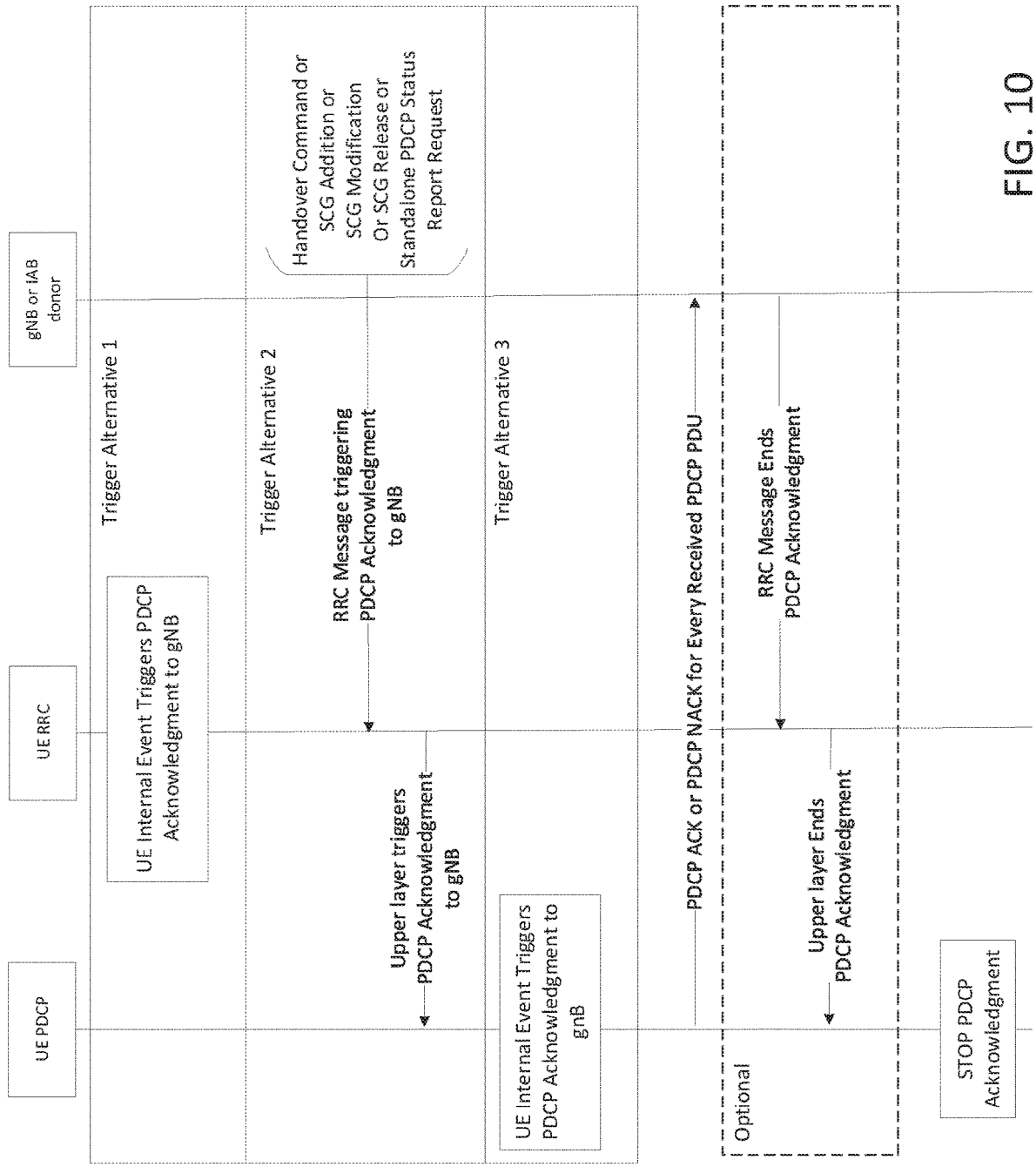
FIG. 10 is a call flow for individual PDCP PDU acknowledgement to a gNB or IAB donor, in accordance with an example embodiment.
Figure 11:
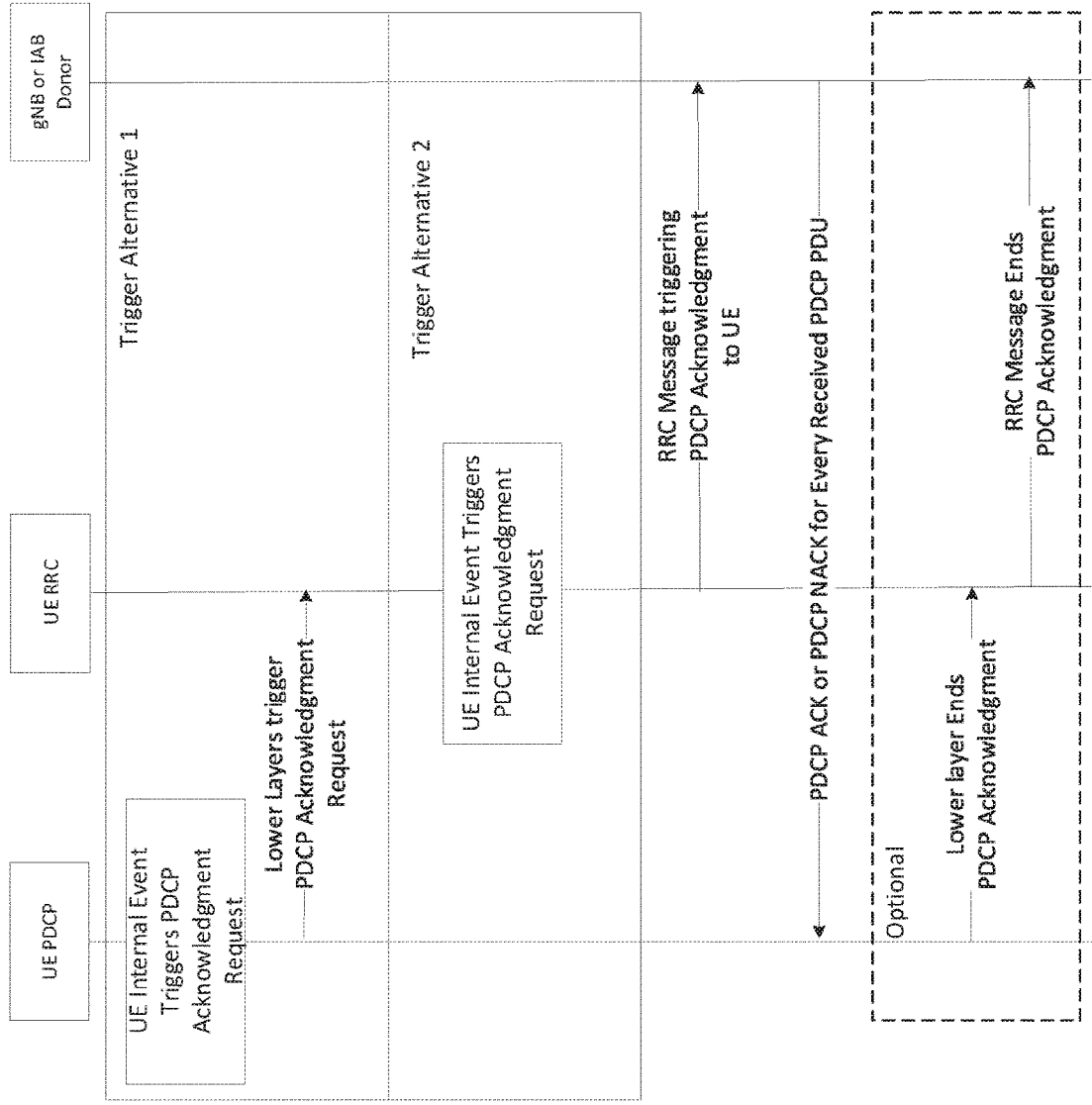
FIG. 11 is a call flow for individual PDCP PDU acknowledgement to UE, in accordance with an example embodiment.

Referring to FIG. 10, the receiving PDCP entity (PDCP receiver) may also trigger PDCP acknowledgment when, for example, RRC reconfigures the UE with addition, release, or modification of SCG cell(s). For example, when the UE receives SCG cell addition, or SCG release or SCG modification RRC message, the upper layers within the UE (e.g., RRC) may request the PDCP entity to transmit PDCP acknowledgment. Referring to FIGS. 10 and 11, the PDCP acknowledgment may take the form of a single PDCP acknowledgement for each received PDPC PDUs subsequent to the request to transmit PDCP acknowledgment, or may take the form of a PDCP status report which provide an ACK for multiple PDUs, or NACK for PDCP PDUs which should have been received by the PDCP entity based on the COUNTs information of PDCPs received out of order.

In another embodiment, upper layers may configure the PDCP entity for periodic PDCP acknowledgment transmission. The PDCP entity may be configured by the upper layer with a timer for periodic PDCP acknowledgment transmission. In yet another embodiment, the PDCP acknowledgment may be window based like the AM RLC status reporting or PDCP status reporting, but applicable to both UM DRBs and AM DRBs. Examples of various PDCP Acknowledgment procedures are further depicted in FIGS. 4-11.

Referring to FIGS. 4-11, various example systems include a UE in communication with an IAB donor or end node. It will be understood that one or more intermediary nodes can be between the UE and end node. It will further be understood that the example systems are simplified to enhance and facilitate the description of the disclosed subject matter and is not intended to limit the scope of this disclosure. Other devices, systems, and configurations may be used to implement the embodiments disclosed herein in addition to, or instead of, a system such as the systems shown in FIGS. 4-11.

Figure 4:
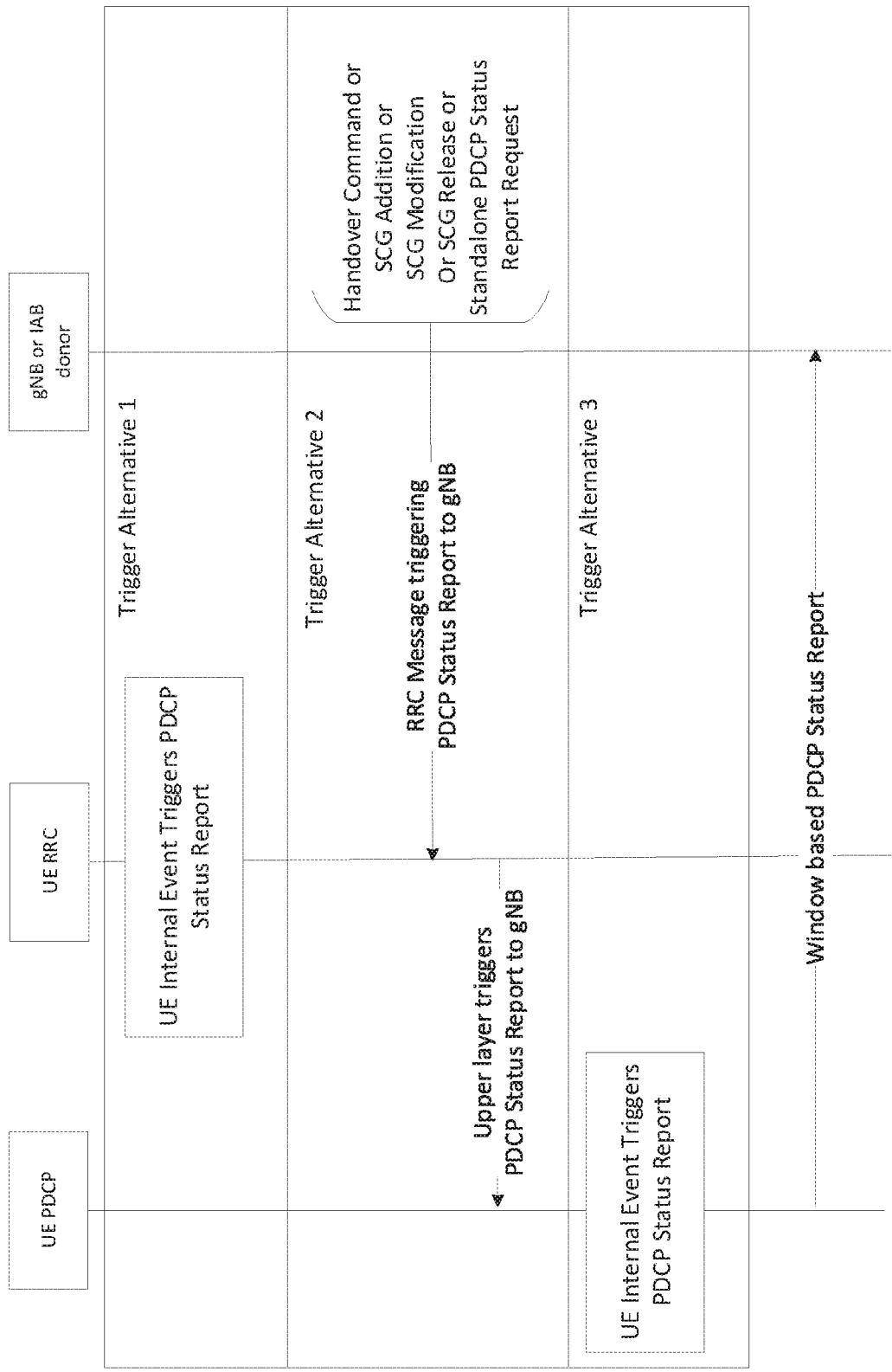
FIG. 4 is a call flow for event-based or on-demand Packet Data Convergence Protocol (PDCP) status reporting by a given user equipment (UE) to a gNB or IAB donor node, in accordance with an example embodiment.

Referring in particular to FIGS. 4, an apparatus can receive a packet data convergence protocol (PDCP) protocol data unit (PDU) from an intermediary node. The PDCP PDU can be sent from an Integrated Access and Backhaul (LAB) node through the intermediary node. Based on a trigger or a status request, the apparatus can generate a PDCP status report, and send the PDCP status report to the Integrated Access and Backhaul (IAB) node. The PDCP status report can indicate an acknowledgement of the PDCP PDU received by the apparatus. In response to receiving the PDCP status report, the PDCP transmitter (e.g., the LAB donor) that sent PDCP PDU can delete the PDCP PDU from its buffer.

Figure 5:
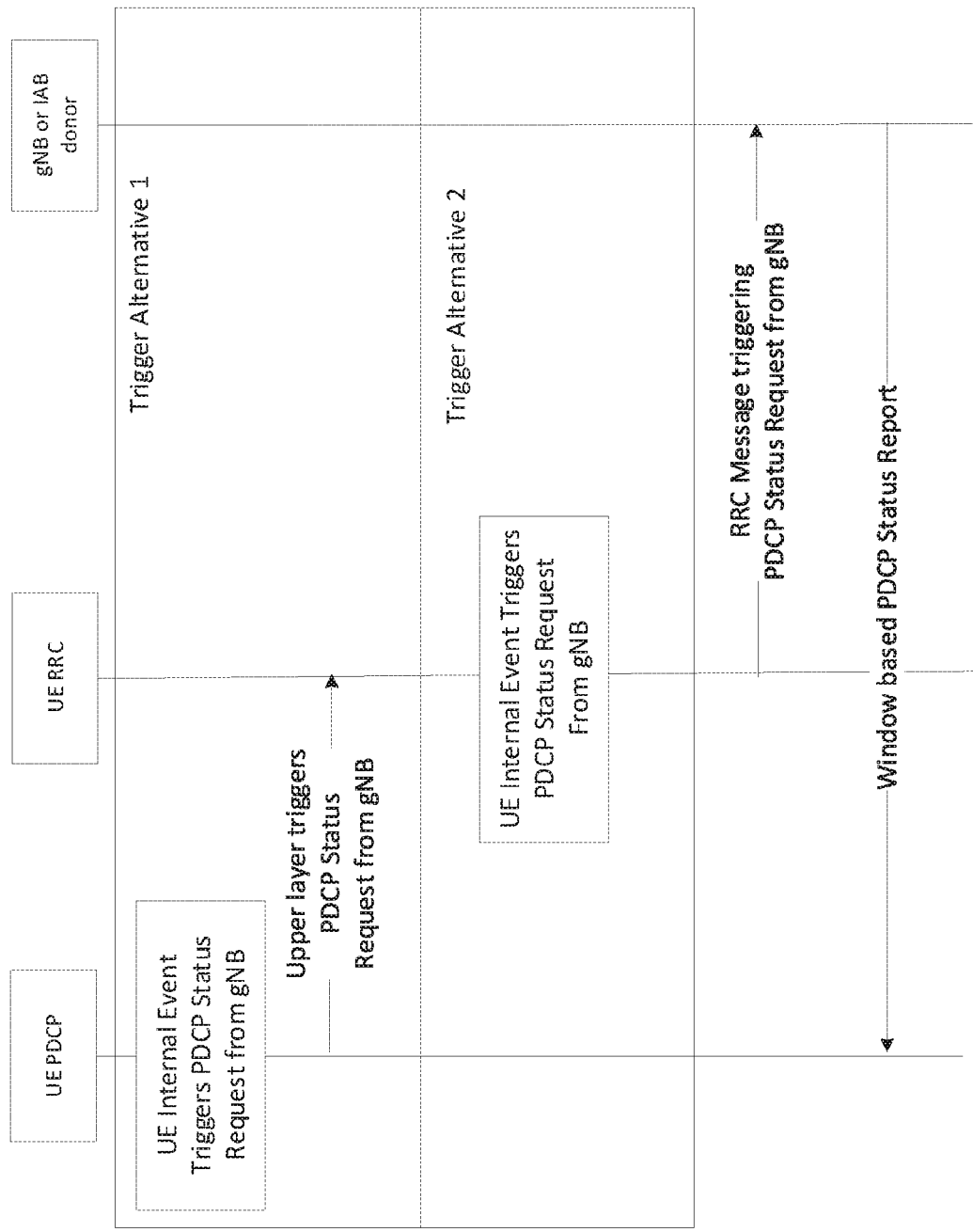
FIG. 5 is a call flow for event-based or on-demand PDCP status reporting by a gNB or IAB donor node to a given UE, in accordance with an example embodiment.

Referring also to FIG. 5, a PDCP transmitter can send to a first intermediary node, a PDCP PDU intended for a PDCP receiver. The PDCP transmitter saves the PDCP PDU in a buffer after the PDCP PDU is sent to the first intermediary node. The PDCP transmitter receives an acknowledgement that indicates that the PDCP PDU is received by the PDCP receiver. In response to the acknowledgement, the PDCP transmitter deletes the PDCP PDU from the buffer. The PDCP transmitter can receive an indication that the PDCP PDU was received by the first intermediary node, and can maintain the PDCP PDU in the buffer after receiving the indication that the PDCP PDU was received by the intermediary node. In an example, the acknowledgement is sent from a second intermediary node connected between the first intermediate node and the PDCP receiver. In another example, the acknowledgement is sent from the PDCP receiver. The PDCP status report can be generated responsive to receiving a request from the PDCP transmitter to send the acknowledgment. In some cases, the request can be indicated in a header of the PDCP PDU.

Referring also to FIG. 10, the PDCP receiver can receive a handover or route update command, and the PDCP status report can be generated responsive to the handover or route update command. Further, the intermediary node can receive the PDCP status report from the PDCP receiver, and can transmit the PDCP status report to the transmitter, so as to relay the acknowledgment between the PDCP receiver and the PDCP transmitter.

It is recognized herein that PDCP acknowledgment to avoid premature deletion of transmitted PDCP PDUs while avoiding unreasonable large PDCP transmitter buffer size and PDCP receiver buffer size may require new interactions between PDCP and RLC for the handling of false positive acknowledgments from RLC. For example, in the case of AM DRB, when an RLC entity indicates successfully delivery of a PDCP PDU to PDCP, this successful indication may be a false acknowledgment as the PDCP PDU might not have been delivered yet to the PDCP peer entity. In example, the PDCP ignores positive acknowledgment from RLC when the PDCP entity and its peer entity has at least one IAB node on the path between them. This may be achieved, for example, by having the PDCP entity configured by upper layers (e.g., RRC) with an indication of whether or not to ignore positive acknowledgment from a lower layer RLC. When PDCP entity is not configured with such indication, in some cases, the PDCP by default does not ignore positive acknowledgment from RLC. The RRC configuration may also be common for both PDCP and RLC acknowledgement processing. For example, when PDCP acknowledgement processing is enabled, RLC acknowledgement processing may be disabled.

An example PDCP acknowledgment signaling design described above includes a hop-by-hop relaying of PDCP acknowledgment by the adaption layer between source transmitter (e.g., UE for uplink traffic, and IAB-donor for downlink traffic, or between any pair of IAB nodes) and final destination receiver (e.g., IAB-donor for uplink traffic, and UE for downlink traffic, or between any pair of IAB nodes). At the reception of PDCP acknowledgment by the adaption layer, the adaption layers can make the determination regarding whether to relay the PDCP acknowledgment or to submit the PDCP acknowledgement (e.g., the PDCP control PDU as an RLC SDU to lower layers for transmission toward the peer transmitter PDCP entity, of the receiver PDCP entity that generates the acknowledgment). For example, in an example of uplink traffic, the adaption layer in the IAB donor relays the PDCP acknowledgment, hop-by-hop to the UE's access IAB node. The adaption layer of the UE's access IAB node may then submit the PDCP acknowledgment to lower layers for transmission to the UE. Similarly, for downlink traffic, the UE PDCP may submit PDCP acknowledgment to lower layer for transmission. The PDCP acknowledgment may be relayed hop-by-hop from the adaption layer in the UE's access IAB node to the adaption layer in the IAB-donor. The adaption layer may perform aggregation of PDCP acknowledgment from the LAB access link to the IAB backhaul link, for example, similar to normal data traffic aggregation.

In an example, the adaption layer of intermediaries IAB nodes relays received RLC acknowledgment (ACK or NACK) back to the preceding transmitting node. In the context of acknowledgment (ACK/or NACK) for uplink transmissions, the preceding transmitting node may be a UE or an LAB node. In the context of acknowledgment for downlink transmission, the preceding transmitting node may be an IAB donor node (e.g., gNB) or an IAB node. The final destination may be an IAB donor node or gNB for UL transmission, or the final destination may be a UE for DL transmission. As used herein, an RLC acknowledgment received from an intermediate node's RLC may be referenced as an "intermediate RLC acknowledgment". Various embodiments for RLC acknowledgement are now described.

In one example, for each received RLC AM PDU, the receiving RLC AM entity in the IAB node only indicates successful delivery or unsuccessful delivery to the peer transmitting RLC AM entity, only after reception of acknowledgment (ACK or NACK) from the next hop IAB node. Thus, an intermediate RLC acknowledgement may be relayed back to the preceding transmitting node. In some cases, for downlink transmission, a receiver IAB node only indicates successful delivery or unsuccessful delivery to the next immediate hop upstream transmitter IAB node (or IAB-donor) only after reception of acknowledgement (ACK or NACK) from the next immediate hop downstream IAB node (or UE). Similarly, in an example uplink transmission, a receiver IAB node only indicates successful delivery or unsuccessful delivery to the next immediate hop downstream transmitter IAB node (or UE) only after reception of acknowledgement (ACK or NACK) from the next immediate hop upstream IAB node (or IAB-donor node). The IAB node's RLC, more specifically IAB node's RLC transmitting entity, may control reception of acknowledgment of transmitted AM RLC PDU with a timer for example RLC re-ordering timer. Upon expiry of such a timer, the transmitting RLC entity may assume a NACK (i.e. the transmission of PDU has failed in subsequent hops). The LAB node in its role of receiver IAB node may then inform the next immediate upstream hop (in the case of downlink traffic) or the next immediate downstream hop IAB node (in the case of uplink traffic) of a NACK for this RLC AM PDU, for example when an RLC status report is generated. This example embodiment may have the advantage of no impact on the behavior of the current PDCP and RLC within the UE. In some cases, this requires a change to the RLC behavior at the IAB node, to delay acknowledgment of successfully received packet until reception of such packet is positively acknowledged by the final destination through casing relaying of the ACKs as described above.

In another example, a receiver IAB node RLC does not wait for acknowledgment of RLC AM PDU from subsequent hops or the final destination before acknowledging reception of that RLC AM PDU to the next immediate upstream hop IAB node (in the case of downlink traffic) or the next immediate downstream hop IAB node (in the case of uplink traffic). In this example embodiment, the adaptation layer may relay separately the acknowledgement (RLC ACK or NACK) of transmitted packets toward the final destination back to the source transmitter. For example, in the case of uplink traffic, the final destination may be the LAB-donor CU and the source transmitter may be the UE. Similarly, for downlink traffic, the final destination may be the UE and the source transmitter may the IAB-donor CU. In some cases, this example may require a new behavior for either PDCP or RLC, or both, in the UE and IAB-donor CU. For example, the current RLC entity behavior is, when receiving a positive acknowledgement for an RLC SDU, the transmitting side of an AM RLC entity sends an indication to the upper layers of successful delivery of the RLC SDU. In the example described herein, one example new behavior of RLC within UE or IAB-donor CU is that, the RLC entity does not inform the upper layers upon successful delivery of the RLC SDU to the peer AM RLC entity. Instead, a new RLC control PDU is introduced to separately inform the source transmitter RLC entity of the finally destination delivery status of RLC AM PDUs. For example, in the case of uplink traffic, at the reception of a relayed acknowledgment (ACK or NACK) corresponding to an RLC AM PDU, by the UE's access IAB node adaption layer, the UE's access IAB node RLC AM entity sends to the UE, a final destination delivery status. Such a new RLC status report mechanism may operate similarly to the existing RLC status report. Similarly, in the case of downlink traffic, at the reception of a relayed acknowledgment (ACK or NAKC) corresponding to an RLC AM PDU, at the adaptation layer of the next immediate hop downstream IAB node relative to the LAB-donor, the adaption layer or that downstream IAB node may forward to the LAB-donor adaptation layer, a final destination delivery status. Also, the RLC protocol may implement the following new behavior: when receiving a final destination delivery positive acknowledgement for an RLC SDU, the transmitting side of an AM RLC entity may send an indication to the upper layers of final destination successful delivery of the RLC SDU. In this case, the transmitting side of an AM RLC entity does not send an indication to the upper layers of successful delivery of the RLC SDU to the peer RLC entity. In the case in which RLC PDUs are reprocessed at intermediary IAB nodes, information identifying which RLC PDUs were combined or split are forwarded to the corresponding RLC entity so that the final destination delivery status correctly indicates which RLC PDUs of the original transmitter have been successfully received.

Figure 12:
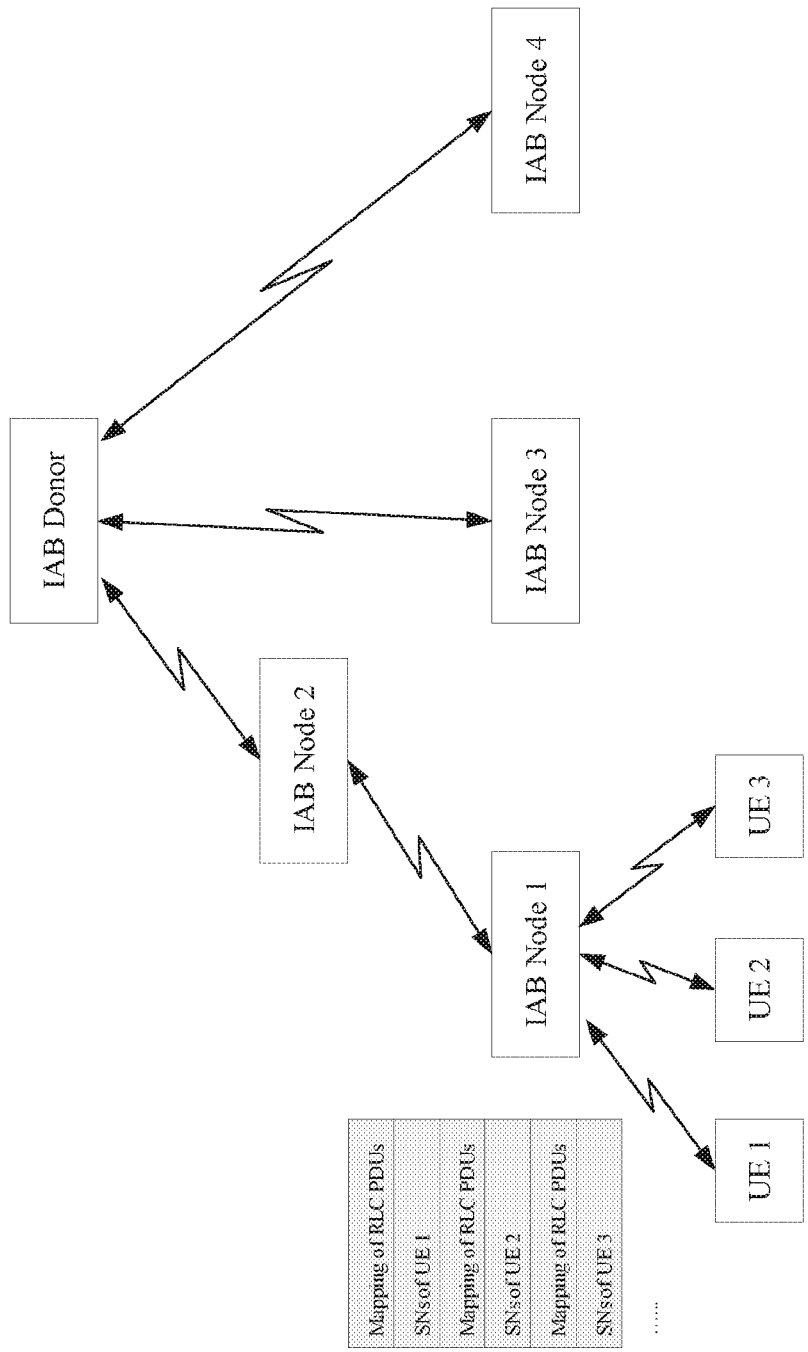
FIG. 12 is a block diagram that depicts relays of RLC acknowledgement in accordance with an example embodiment.

Referring to FIG. 12, if an IAB link is configured using this example method, then the preceding transmitting node, in some cases, will not delete PDUs in the buffer upon receiving ACK in the RLC acknowledgement from the IAB node directly connected it. More specifically, a transmitter node (e.g., IAB node, UE, or IAB-donor), in some cases, will not delete, from its transmission buffer, a PDU for which an ACK is received from the immediate next node. It may re-transmit the data that are NACKed in the RLC acknowledgement. Instead, it may wait until it receives the relayed RLC acknowledgement from the next hop, then it may delete the corresponding PDUs that are acknowledged. In an example, however, it will not retransmit. Such a RLC acknowledgement report can be achieved by re-using the RLC status PDU. RRC may configure a timer to PDCP to guard how long an unacknowledged PDCP PDU stays in PDCP buffer before being deleted from the buffer.

In another example, the intermediate node does not relay any RLC acknowledgement (including the intermediate RLC acknowledgement and RLC acknowledgement from the final destination) back to the preceding transmitting node.

In some cases, a mapping between received RLC PDUs and transmitted RLC PDUs over next hop may be maintained in IAB node. The mapping may include association between the Sequence Numbers (SNs) of received RLC PDUs and the SNs of transmitted RLC PDUs over the next hop. The mapping may be used in the IAB node receiver side to track the status of received RLC PDUs in terms of which received RLC PDUs can be acknowledged back to the transmitter. The methods for the relaying of RLC Acknowledgment described above may also be implemented in the RLC, instead of the Adaption layer.

In an alternative embodiment to the above-described example, the RLC ACK/NACKs may be relayed from the final destination receiver back to the source transmitter through the control plane signaling. The triggering for relaying of ACKs (either in user plane or control plane) may be through, for example, RRC configuration, UE internal event, or user plane control PDU. It will be understood that examples described herein, unless otherwise specified, may apply to both transmissions over Data Radio Bearers (DRBs) or transmissions over Signaling Radio Bearers (SRBs).

With respect to end-to-end acknowledgement between IAB nodes, an example embodiment is introduced for an acknowledgement between the IAB node connected to the UE and the IAB Donor node. In the uplink (UL), when the IAB node connected to the UE receives acknowledgement from the LAB Donor node, it may inform the RLC instance connected to the UE to generate RLC acknowledgement of the corresponding transmissions. In the DL, when the IAB node connected to the UE receives RLC acknowledgement from the UE, it may inform the IAB Donor of acknowledgement of the corresponding transmissions. The end-to-end protocol between the IAB node connected to the UE and the IAB Donor node could be the PDCP acknowledgement procedures described herein With respect to buffer size control, various embodiments may avoid buffer overflow and buffer starvation. Unless otherwise specified, the buffer management or flow control solutions described hereinafter apply to both downlink flow control or buffer management, and/or uplink flow control or buffer management.

Flow Control solutions and active queue management are discussed below. In one embodiment, the flow control may be in the form of explicit flow control notification action initiated by the congested node or the starved node, or the node that detects buffer overflow or buffer starvation. In an example, any IAB node may control the flow of data from the source (e.g., the UE or IAB donor). The explicit flow control notification may, for example, be a one bit indication that the receiver sends to the transmitter may indicate to the transmitter to either decrease or increase its rate of transmission, or to halt or start transmissions toward the receiver that issues the flow control notification. In yet another example of explicit flow control notification, the flow control notification may be used by the receiver to indicate to the transmitter, the expected data rate. In another embodiment, the flow control notification may be in the form of an implicit notification, for example in the form of assistance information to the transmitter, which then uses such information for buffer management decisions and whether to start data transmission, increase data transmission rate, or to stop data transmission, or to decrease data transmission rate. The assistance information may represent the amount of data buffered at the LAB node generating the flow control commend. Furthermore, the flow control may take the form of an active Queue management where the transmitter may proactively drop packet to avoid congestion and buffer overflow at the receiver.

The flow control may be implemented in RLC, in the adaption layer, in the PDCP, or in the MAC. The upper layers (e.g., RRC) may configure the layer that implements the buffer size control function with configuration parameters for buffer control. Parameters for buffer size control may include one or more of the following: buffer size, lower end of buffer size, upper end of buffer size, expected data rate, the target BLER, the target packet drop rate, and/or the number of IAB node hops. For example, the lower end of the buffer size may be used by the receiver to trigger an indication toward the peer transmitter to increase its transmission rate. Similarly, the upper end of the buffer size may be used by the receiver to trigger an indication toward the peer transmitter to decrease its transmission rate, or to start actively dropping packets to prevent congestion. An adaption layer control PDU or RLC control PDU may be specified in support of buffer size control.

Various embodiments concerning explicit flow control and implicit flow control mechanisms are now further described. For flow control, the data receiver may provide feedback to the data transmitter so that the transmitted data from the transmitter to the receiver can be flow controlled. As used herein, unless otherwise specified, a receiver or receiver node may refer to any node that may issue or transmit an explicit flow control notification message or an implicit flow control notification message. Similarly, unless otherwise specified, a transmitter or transmitter node may refer to any node that may receive an explicit flow control notification message or an implicit flow control notification message, and triggers flow control action as a result of receiving a flow control notification message. Unless otherwise specified, the flow control examples described hereinafter may be applied to both AM RBs and UM RBs.

The flow control mechanisms described herein may be end-to-end flow control or hop-by-hop flow control. The end-to-end flow control may be performed between UE and IAB-donor CU. The hop-by-hop flow control may be performed between UE and UE's access IAB node DU, or between UE's access IAB node DU and intermediary IAB node DU (for e.g., in more than one hop scenario), or between UE's access IAB node DU and IAB-donor DU (for e.g., in one hop scenario), or between intermediary IAB node DU and IAB-donor DU (for e.g., in more than one hop scenario), or between IAB-donor DU and IAB-donor CU.

In one example (option 1), the flow control takes place between the UE and the IAB-donor CU. For flow control of downlink traffic, the UE is the receiver and the LAB-donor CU is the transmitter. In the example, for flow control of uplink traffic, the IAB-donor CU is the receiver and the UE is the transmitter. In this option, the flow control may be specified at the PDCP layer. A PDCP control PDU may be used as flow control indication message. The PDCP control PDU may be specified in the form of an explicit flow control notification message or alternatively in the form of an implicit flow control notification message. For example, in the case of explicit flow control, the flow control mechanism may be specified such that the receiver node (e.g., UE for downlink flow control and IAB-donor CU for uplink flow control) sends a PDCP control PDU with an explicit flow control request to the peer transmitter node (IAB-donor CU for downlink flow control and UE for uplink flow control). In the case of implicit flow control, the flow control mechanism may be specified such that the receiver node (e.g., UE for downlink flow control and IAB-donor CU for uplink flow control) issuing the PDCP control PDU sends a PDCP control PDU that provides to the peer transmitter node (e.g., UE for downlink flow control and IAB-donor CU for uplink flow control), a flow control assistance or buffer management assistance message. In this implicit flow control alternative, the node generating the traffic being subject to flow control (e.g., the transmitter node) receives an assistance information from other nodes, and makes the decision to perform flow control. For example, flow control may be performed so as to take the various actions such as: stop data transmission, reduce transmitted data rate, start data transmission, increase transmission data rate, drop packet from the transmitter buffer, etc. For downlink flow control, the UE may send such a PDCP control PDU to the LAB-donor CU, while for uplink flow control, the LAB-donor may send a PDCP control PDU to the UE.

Alternatively, a flow control mechanism at the PDCP layer may be specified in the form of indication that consists of one or more information elements in the PDCP PDU header. The UE may send a flow control notification message to the IAB-donor CU as a result of a flow control feedback message from an intermediary IAB node. For example, for a downlink flow control, an intermediate LAB node may send, to the UE, a feedback for flow control of downlink traffic. Such feedback may be carried by lower layer protocols below PDCP. For example, a feedback for downlink flow control may be carried from an intermediary IAB node to the UE in the form of a MAC control PDU or as an indication in the MAC PDU header. Alternatively, such feedback may be carried in the form of an RLC control PDU or as an indication on the RLC header. Upon receiving such feedback, the UE may take one or more of the following actions, presented by way of example and without limitation: send a flow control message for downlink flow control to the IAB-donor CU; or initiate route change (for e.g. select new route).

Similar examples may apply for flow control of uplink traffic. For uplink flow control, an intermediate IAB node may send, to the IAB-donor, a feedback for flow control of uplink traffic. Such feedback may be carried by lower layer protocols below PDCP. For example, a feedback for uplink flow control may be carried from an intermediary IAB node to the UE in the form of a MAC control PDU or as an indication in the MAC PDU header. Alternatively, such feedback for uplink flow control may be carried in the form of an RLC control PDU or as an indication on the RLC header. Upon receiving such feedback, the IAB-donor may take one or more of the following actions, for example and without limitation: send a flow control message for uplink flow control to the UE; or initiate route change (for e.g., select new route).

The end-to-end flow control embodiments described herein may be integrated with solutions described herein to avoid premature deletion of transmitted PDCP PDUs. Solutions for avoiding premature deletion of transmitted PDCP PDUs provide end-to-end signaling identifying acknowledged data. The acknowledged data indication may be expanded to support end-to-end flow control. It is recognized herein that a common procedure that accomplishes deletion of transmitted data and flow control may add efficiencies and simplicity.

The explicit flow control notification messages may include one of more of the following information elements, presented by way of example and without limitation:

Stop data transmission indication. This indication may be bearer specific, or QoS Flow Specific, or UE specific. Furthermore, the indication may be intermediary IAB node specific or route specific, where a route consists of a specific data path between the UE and the LAB-donor CU including the intermediary IAB nodes.

Start data transmission indication. This indication may be bearer specific, or QoS Flow Specific, or UE specific. Furthermore, the indication may be intermediary IAB node specific or route specific, where a route consists of a specific data path between the UE and the IAB-donor CU including the intermediary IAB nodes.

Increase data transmission rate indication. This indication may be bearer specific, or QoS Flow Specific, or UE specific. Furthermore, the indication may be intermediary IAB node specific or route specific, where a route consists of a specific data path between the UE and the IAB-donor CU including the intermediary LAB nodes.

Decrease data transmission rate indication. This indication may be bearer specific, or QoS Flow Specific, or UE specific. Furthermore, the indication may be intermediary IAB node specific or route specific, where a route consists of a specific data path between the UE and the IAB-donor CU including the intermediary IAB nodes.

Bearer ID

QoS Flow ID®

New data rate. The new data rate may be bearer specific, or QoS Flow Specific, or UE specific. Furthermore, the indication may be intermediary IAB node specific or route specific, where a route consists of a specific data path between the UE and the IAB-donor CU including the intermediary IAB nodes.

Amount of increase in data rate. The amount of increase in data rate may be bearer specific, or QoS Flow Specific, or UE specific. Furthermore, the indication may be intermediary IAB node specific or route specific, where a route consists of a specific data path between the UE and the IAB-donor CU including the intermediary IAB nodes. The amount of increase in data rate can be expressed as a percentage of the current data rate in the signaling, for example.

Amount of decrease in data rate. The amount of decrease in data rate may be bearer specific, or QoS Flow Specific, or UE specific. Furthermore, the indication may be intermediary IAB node specific or route specific, where a route consists of a specific data path between the UE and the IAB-donor CU including the intermediary IAB nodes. The amount of decrease in data rate can be expressed as a percentage of the current data rate in the signaling, for example.

ID of the intermediary IAB node for which downlink flow control should be applied ID of the route for which downlink flow control should be applied.

The implicit flow control notification message may include one or more of the following information elements, presented by way of example and without limitation:

Available capacity in the receiver buffer. This indication may be bearer specific, or QoS Flow Specific, or UE specific. Furthermore, the indication may be intermediary IAB node specific or route specific, where a route consists of a specific data path between the UE and the IAB-donor CU including the intermediary IAB nodes.

Amount of data in the receiver buffer. This indication may be bearer specific, or QoS Flow Specific, or UE specific. Furthermore, the indication may be intermediary IAB node specific or route specific, where a route consists of a specific data path between the UE and the IAB-donor CU including the intermediary IAB nodes. The receiver may scale the reported amount of data in the receiver buffer, taking into account the route information, for example the hop count between the receiver and the transmitter.

An indication that amount of data in the receiver buffer is below receiver buffer lower edge threshold. For downlink flow control, this threshold may be configured into the UE by RRC configuration. This threshold may be bearer specific, or QoS Flow Specific, or UE specific. Furthermore, the indication may be intermediary IAB node specific or route specific, where a route consists of a specific data path between the UE and the IAB-donor CU including the intermediary IAB nodes.

An indication that amount of data in the receiver buffer is above the receiver buffer upper edge threshold. For downlink flow control, this threshold may be configured into the UE by RRC configuration. This threshold may be bearer specific, or QoS Flow Specific, or UE specific. Furthermore, the indication may be intermediary IAB node specific or route specific, where a route consists of a specific data path between the UE and the IAB-donor CU including the intermediary IAB nodes.

NR PDCP Status report content including the First Missing Count (FMC) i.e. the COUNT value of the first missing PDCP SDU within the reordering window and the bitmap that indicates which SDUs are missing and which SDUs are correctly received in the receiving PDCP entity.

Bearer ID

QoS Flow ID

ID of the intermediary IAB node for which downlink flow control should be applied ID of the route for which downlink flow control should be applied At the reception of the flow control message, the transmitter may use one or more of the parameters included in the received flow control message determine one or more of the following flow control actions, presented by way of example and without limitation:

Stop data transmission toward the receiver. For example, the transmitter may stop data transmission for a specific bearer, a specific QoS Flow, a UE, a specific route or a specific IAB node. For example, in response to UL flow control message, the UE may stop data transmission on a specific route, or redirect data over another route. Similarly, for example in response to downlink flow control message, the IAB-donor CU may stop the transmission of data mapped to a specific radio bearer, stop data transmission on a specific route, or redirect data over another route.

Reduce transmission data rate toward the receiver. For example, the transmitter may reduce transmission data rate for a specific bearer, a specific QoS Flow, a UE, a specific route, or a specific IAB node. For example, in response to UL flow control message, the UE may reduce transmission data rate on a specific route, or redirect data over another route. Similarly, for example in response to a downlink flow control message, the IAB-donor CU may reduce the transmission data rate of data mapped to a specific radio bearer, or reduce data transmission rate on a specific route or redirect data with a reduced data rate over another route.

Start data transmission toward the receiver. For example, the transmitter may start/resume data transmission for a specific bearer, a specific QoS Flow, a UE, a specific route, or a specific IAB node. For example, in response to UL flow control message, the UE may start/resume data transmission on a specific route, or redirect data over another route. Similarly, for example in response to downlink flow control message, the IAB-donor CU may start/resume the transmission of data mapped to a specific radio bearer, start/resume data transmission on a specific route, or redirect data over another route.

Increase transmission data rate toward the receiver. For example, the transmitter may increase transmission data rate for a specific bearer, a specific QoS Flow, a UE, a specific route or a specific IAB node. For example, in response to UL flow control message, the UE may increase transmission data rate on a specific route, or redirect data over another route. Similarly, for example in response to downlink flow control message, the IAB-donor CU may increase the transmission data rate of data mapped to a specific radio bearer, or reduce data transmission rate on a specific route or redirect data within an increase data rate over another route.

Drop packet from the transmitter buffer.

Perform selection of new route or new intermediary IAB node.

The flow control notification message may be triggered periodically or may be event-based. For downlink flow control, the flow control events or periodic flow control timer(s) may be configured into the UE by RRC configuration. The following events may be specified, by way of example without limitation:

available capacity in the receiver buffer is above a threshold C1 available capacity in the receiver buffer is below a threshold C2 amount of data in the receiver buffer is below receiver buffer lower edge threshold B_L amount of data in the receiver buffer is above the receiver buffer upper edge threshold B_U Last correctly received PDCP SDU sequence number is above re-ordering window upper edge sequence number threshold U-SN. The reordering window upper edge sequence number may be defined as the highest sequence number of correctly received PDCP SDU that can be accommodated by the receiver reordering window. The threshold U-SN may be defined as the reordering window upper edge sequence number or may be defined with an offset relative to the reordering window upper edge sequence number.

Upon expiry of flow control periodic timer or upon expiry of the re-ordering timer t-Reordering.

Mobility events such as mobility of the UE as a result of conditional handover or other UE controlled mobility events requiring the UE to trigger flow control. For example, at such an event, the UE may request the UE's access IAB node to stop downlink traffic or re-route downlink traffic through another IAB node.

UE detects a failure (for e.g. radio link failure) toward the upstream IAB node or IAB-donor node. In an example, the LAB node may initiate downlink flow control toward upstream IAB node. For example, at detection of radio link failure toward Secondary Cell Group (SCG) cell, the LAB node may initiate downlink flow control toward upstream IAB node.

UE detects failure of access link SCG cell. For example, at detection of such event, the IAB node may initiate downlink flow control toward upstream IAB node or IAB-donor. Similarly, this event may cause the IAB node to trigger uplink flow control toward downstream IAB node.

Change or selection of new route. At selection of a new route, the IAB node may trigger downlink flow control toward an upstream transmitter IAB node or IAB-donor. Similarly, the IAB node may trigger uplink flow control toward downstream IAB node or the UE.

UE receives downlink flow control indication message from UE's access IAB node, other intermediary IAB nodes. This may trigger the UE to initiate downlink flow control toward the LAB-donor node.

IAB-donor CU receives uplink flow control indication message from IAB donor node or IAB-donor DU node. This may trigger the IAB-donor CU to initiate uplink flow control toward the UE.

As indicated herein, the flow control indication may be carried in a PDCP PDU header (for e.g., as a single bit to start/stop flow control). Therefore, the flow control indication message may be piggybacked on the PDCP status report as an indication in the PDCP status report header. It will be understood that the examples are described above in terms of the PDCP layer for purposes of example, and they are not limited to the PDCP layer, for example they may also be specified in the SDAP adaptation layer.

In another Hop-by-Hop Flow Control example (Option 2), the flow control takes place between the UE's access IAB node and the IAB-donor CU, or between an intermediary IAB node and the IAB-donor CU, or between two intermediaries IAB-nodes, or between the UE and the UE's access IAB node. For flow control of downlink traffic, the UE, or the UE's access IAB node or an intermediary IAB node, may be the receiver, and the transmitter may be an IAB-donor CU, a UE's access IAB node, or an intermediary IAB node. For flow control of uplink traffic, the IAB-donor CU, or the UE's access IAB node, or an intermediary IAB node may be the receiver, and the transmitter may be the UE, the UE's access IAB node, or an intermediary IAB node. In this option, the flow control mechanism may be specified at the MAC layer or at the RLC layer, at the adaption layer or at the F1-U (or equivalently F1-U*) layer. A MAC control PDU, or an RLC control PDU, or an adaptation control PDU, or an F1-U (or F1-U*) control PDU such as GTP control PDU, may be used as flow control indication message. For simplicity, the protocol layer for hop-by-hop flow control is now denoted as the Hop-by-hop Flow Control datalink (L2) Protocol, referred to hereinafter as HFCP. But in some examples, the HFCP may be called out as the MAC protocol, RLC protocol, Adaptation layer protocol, or FIU (or FIU*) GTP protocol.

The HFCP control PDU may be specified in the form of an explicit flow control notification message or alternatively in the form of an implicit flow control notification message. For example, in the case of explicit flow control, the flow control mechanism may be specified such that the receiver node (e.g., UE, or UE's access IAB node or IAB node in the case of downlink flow control, or IAB-donor CU or IAB node in the case of uplink flow control) sends a HFCP control PDU with an explicit flow control request to the peer transmitter node (e.g., IAB-donor CU or IAB-node in the case of downlink flow control, or UE or UE's access LAB node or IAB-node in the case of uplink flow control). In the case of implicit flow control, the flow control mechanism may be specified such that the receiver node (i.e. UE, or UE's access IAB node or IAB node in the case of downlink flow control, or IAB-donor CU or IAB node in the case of uplink flow control) issuing the HFCP control PDU sends a HFCP control PDU that provides to the peer transmitter node (i.e. IAB-donor CU or IAB-node in the case of downlink flow control, or UE or UE's access IAB node or IAB-node in the case of uplink flow control), a flow control assistance or buffer management assistance message. In this implicit flow control alternative example, the node generating the traffic being subject to flow control (i.e. the transmitter node) receives an assistance information from other nodes, and makes the decision to perform flow control (i.e. to perform for e.g. one or more of the following action: stop data transmission, reduce transmitted data rate, start data transmission, increase transmission data rate, drop packet from the transmitter buffer, re-route traffic through another route, etc.).

In an alternative embodiment to specifying the flow control message as a HFCP control PDU, the flow control mechanism at the HFCP layer may be specified in the form of an indication that consists of one or more information elements in the HFCP PDU header.

The explicit HFCP flow control notification message may include one of more of the following information elements, presented by way of example and without limitation: a stop data transmission indication, a start data transmission indication, and an increase data transmission rate indication, a decrease data transmission rate indication, the UE's bearer ID, the IAB's bearer ID, the UE's ID, a new data rate, an indication of amount of an increase in data rate, and/or an indication of an amount of decrease in data rate.

The stop data transmission indication may target the entire transmitter LAB node, or may be UE specific, UE bearer specific, IAB bearer specific, data path specific (for e.g. in case of data duplication over parallel data paths between the receiver and the transmitter), and/or route specific. In some cases, in a route specific example for downlink flow control, the targeted route may be the data path between the receiver IAB node transmitting the flow control indication message and the UE. For uplink flow control, the target route may be the data path between the receiver IAB node transmitting the flow control indication message and the IAB-donor CU. Furthermore, the indication may be downstream IAB node specific or upstream IAB node specific. For downlink flow control, for example, the receiver IAB node transmitting the HFCP message may indicate to an upstream transmitter IAB node, to stop data transmission toward a specific IAB node, which is a downstream IAB node of the receiver IAB node transmitting the HFCP message. Similarly, for uplink flow control, the receiver IAB node transmitting the HFCP message may indicate to a downstream transmitter IAB node, to stop data transmission toward a specific IAB node, which is an upstream IAB node of the receiver IAB node transmitting the HFCP message.

The start data transmission indication may target the entire transmitter IAB node, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the IAB-donor CU. The indication may be IAB specific. In such an example, for downlink flow control, the receiver IAB node transmitting the HFCP message may indicate to an upstream transmitter IAB node, to start/resume data transmission toward a specific IAB node, which is a downstream IAB node of the receiver IAB node transmitting the HFCP message. Similarly, for uplink flow control, the receiver IAB node transmitting the HFCP message may indicate to a downstream transmitter LAB node, to start/resume data transmission toward a specific IAB node, which is an upstream IAB node of the receiver IAB node transmitting the HFCP message.

The increase data transmission rate indication may target the entire transmitter IAB node, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the IAB-donor CU. The indication may be IAB specific. In such an example, for downlink flow control, the receiver IAB node transmitting the HFCP message may indicate to an upstream transmitter IAB node, to increase the data rate toward a specific IAB node, which is a downstream IAB node of the receiver IAB node transmitting the HFCP message. Similarly, for uplink flow control, the receiver IAB node transmitting the HFCP message may indicate to a downstream transmitter IAB node, to increase the data rate toward a specific IAB node, which is an upstream IAB node of the receiver IAB node transmitting the HFCP message.

The decrease data transmission rate indication may target the entire transmitter IAB node, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver LAB node transmitting the flow control indication message and the UE. For uplink flow control, the target route may be the data path between the receiver IAB node transmitting the flow control indication message and the IAB-donor CU. The indication may be IAB specific. In such an example, for downlink flow control, the receiver IAB node transmitting the HFCP message may indicate to an upstream transmitter IAB node, to decrease the data rate toward a specific IAB node, which is a downstream IAB node of the receiver IAB node transmitting the HFCP message. Similarly, for uplink flow control, the receiver IAB node transmitting the HFCP message may indicate to a downstream transmitter IAB node, to decrease the data rate toward a specific IAB node, which is an upstream IAB node of the receiver IAB node transmitting the HFCP message.

The new data rate information element may target the entire transmitter IAB node, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the IAB-donor CU. The new data rate may also be IAB specific. In such an example, for downlink flow control, the receiver IAB node transmitting the HFCP message may indicate to an upstream transmitter IAB node, a new data rate toward a specific IAB node, which is a downstream IAB node of the receiver IAB node transmitting the HFCP message. Similarly, for uplink flow control, the receiver IAB node transmitting the HFCP message may indicate to a downstream transmitter IAB node, a new data rate toward a specific IAB node, which is an upstream IAB node of the receiver IAB node transmitting the HFCP message.

The amount of increase in data rate may target the entire transmitter IAB node, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the IAB-donor CU. The increase in data rate IE may be IAB specific. In such an example, for downlink flow control, the receiver IAB node transmitting the HFCP message may indicate to an upstream transmitter IAB node, an increase in data rate toward a specific IAB node, which is a downstream IAB node of the receiver IAB node transmitting the HFCP message. Similarly, for uplink flow control, the receiver IAB node transmitting the HFCP message may indicate to a downstream transmitter IAB node, an increase in data rate toward a specific IAB node, which is an upstream IAB node of the receiver IAB node transmitting the HFCP message. The amount of increase in data rate can be expressed as a percentage of the current data rate in the signaling, for example.

The amount of decrease in data rate may target the entire transmitter IAB node, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the LAB-donor CU. Furthermore, the decrease in data rate may be IAB specific. In IAB specific example, for downlink flow control, the receiver IAB node transmitting the HFCP message may indicate to an upstream transmitter IAB node, a decrease in data rate toward a specific IAB node, which is a downstream IAB node of the receiver IAB node transmitting the HFCP message. Similarly, for uplink flow control, the receiver IAB node transmitting the HFCP message may indicate to a downstream transmitter IAB node, a decrease in data rate toward a specific IAB node, which is an upstream IAB node of the receiver IAB node transmitting the HFCP message. The amount of decrease in data rate can be expressed as a percentage of the current data rate in the signaling, for example.

The HFCP implicit flow control notification message may include one or more of the following information elements (IEs), presented by way of example and without limitation: available capacity in the receiver buffer, the buffer size, an indication that the amount of data in the receiver buffer is below a receiver buffer lower edge threshold, an indication that the amount of data in the receiver buffer is above a receiver buffer upper edge threshold, the UE's ID, the UE's bearer ID, an ID of the intermediary IAB node for which downlink flow control should be applied, and/or an ID of the route for which downlink flow control should be applied.

The available capacity in the receiver buffer IE may reflect the available capacity of the receiver transmitting the HFCP message, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the IAB-donor CU. Furthermore the indication may be IAB specific. In some IAB specific examples, for downlink flow control, the receiver IAB node transmitting the HFCP message may indicate to an upstream transmitter LAB node, available capacity at a specific IAB node, which is a downstream IAB node of the receiver IAB node transmitting the HFCP message. Similarly, for uplink flow control, the receiver IAB node transmitting the HFCP message may indicate to a downstream transmitter IAB node, the available capacity at a specific LAB node, which is an upstream IAB node of the receiver IAB node transmitting the HFCP message. Such capacity for upstream IAB node or downstream LAB node relative to the IAB node transmitting the HFCP message, may also be UE specific, UE's bearer specific, or IAB's bearer specific.

The buffer size (i.e. amount of data in the receiver buffer) IE may indicate or reflect the available data in the entire receiver buffer of the receiver transmitting the HFCP message, or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver LAB node transmitting the flow control indication message and the UE. For uplink flow control, the target route may be the data path between the receiver IAB node transmitting the flow control indication message and the IAB-donor CU. Furthermore the reported buffer size may be downstream IAB specific or upstream IAB node specific. In such cases, for downlink flow control, the receiver IAB node transmitting the HFCP message may indicate to an upstream transmitter IAB node, the buffer size at a specific IAB node, which is a downstream IAB node of the receiver IAB node transmitting the HFCP message. Similarly, for uplink flow control, the receiver IAB node transmitting the HFCP message may indicate to a downstream transmitter IAB node, the buffer size at a specific IAB node, which is an upstream IAB node of the receiver IAB node transmitting the HFCP message. Such a buffer size for upstream IAB node or downstream IAB node relative to the LAB node transmitting the HFCP message, may also be UE specific, UE's bearer specific or IAB's bearer specific. The receiver may scale the reported buffer size taking into account the route information (e.g., the hop count, for example, between the receiver and the transmitter or between the downstream IAB node or the upstream IAB node that the reported buffer size relates to and the transmitter).

For downlink flow control, the lower edge threshold may be configured into the UE by RRC configuration. This threshold may target the entire receiver buffer of the receiver IAB node transmitting the HFCP message or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the LAB-donor CU. Furthermore the reported indication may be upstream IAB node specific or downstream IAB node specific, where for example for downlink flow control, the receiver IAB node transmitting the HFCP message may indicate to an upstream transmitter IAB node, this event specific to an IAB node, which is a downstream IAB node of the receiver IAB node transmitting the HFCP message. Similarly, for uplink flow control, the receiver IAB node transmitting the HFCP message may indicate to a downstream transmitter IAB node, this event that is specific to an IAB node, which is an upstream IAB node of the receiver LAB node transmitting the HFCP message. Also in this case, such an event indication for upstream IAB node or downstream IAB node relative to the IAB node transmitting the HFCP message, may be UE specific, UE's bearer specific, or IAB's bearer specific.

For downlink flow control, the upper edge threshold may be configured into the UE by RRC configuration. This threshold may aim at the entire receiver buffer of the receiver IAB node transmitting the HFCP message or may be UE specific, UE's bearer specific, IAB's bearer specific, data path specific (for e.g. in case of data duplication over parallel data paths between the receiver and the transmitter), and/or route specific. In some route specific examples, for downlink flow control, the targeted route may be the data path between the receiver IAB node transmitting the flow control indication message and the UE. For uplink flow control, the target route may be the data path between the receiver IAB node transmitting the flow control indication message and the IAB-donor CU. Furthermore the reported indication may be upstream IAB node specific or downstream IAB node specific. For example, for downlink flow control, the receiver IAB node transmitting the HFCP message may indicate to an upstream transmitter IAB node, this event specific to an IAB node, which is a downstream IAB node of the receiver IAB node transmitting the HFCP message. Similarly, for uplink flow control, the receiver IAB node transmitting the HFCP message may indicate to a downstream transmitter IAB node that this event is specific to an IAB node, which is an upstream IAB node of the receiver IAB node transmitting the HFCP message. Also in this case, such an event indication for upstream IAB node or downstream IAB node relative to the LAB node transmitting the HFCP message, may be UE specific, UE's bearer specific, or IAB's bearer specific.

At the reception of the flow control message, the transmitter may use one or more of the parameters included in the received flow control message to select one or more of the following flow control actions, presented by way of example and without limitation: stop data transmission toward the receiver, reduce transmission data rate toward the receiver, start data transmission toward the receiver, increase transmission data rate toward the receiver, drop packet from the transmission buffer, and/or perform selection of a new route or new intermediary IAB node.

With respect to stopping data transmission toward the receiver, in some cases, the transmitter IAB node may stop data transmission for a specific UE, a UE specific bearer, an IAB node specific bearer, a specific route, a specific upstream IAB node in the case of an uplink flow control, and/or a specific downstream IAB node in the case of a downlink flow control. Similarly, the transmitter IAB-donor node may stop data transmission for a specific UE, a UE specific bearer, an IAB node specific bearer, a specific route, and/or a specific downstream IAB node in the case of downlink flow control. Such an indication for upstream IAB node or downstream IAB node relative to the IAB node transmitting the HFCP message, may also be UE specific, UE's bearer specific, or IAB's bearer specific.

With respect to reducing the transmission data rate toward the receiver, in some cases, the transmitter IAB node may reduce the data rate for a specific UE, a UE specific bearer, an IAB node specific bearer, a specific route, a specific upstream IAB node in the case of an uplink flow control, and/or a specific downstream IAB node in the case of a downlink flow control. Similarly, the transmitter IAB-donor may reduce data transmission rate for a specific UE, a UE specific bearer, an IAB node specific bearer, a specific route, and/or a specific downstream IAB node in the case of downlink flow control. Such an indication to reduce data rate, for upstream IAB node or downstream IAB node relative to the IAB node transmitting the HFCP message, may also be UE specific, UE's bearer specific, or IAB's bearer specific.

With respect to starting a data transmission toward the receiver, in some cases, the transmitter IAB node may start/resume data transmission for a specific UE, a UE specific bearer, an IAB node specific bearer, a specific route, a specific upstream IAB node in the case of an uplink flow control, and/or a specific downstream IAB node in the case of a downlink flow control. Similarly, the transmitter IAB-donor may start/resume data transmission for a specific UE, a UE specific bearer, an IAB node specific bearer, a specific route, and/or a specific downstream IAB node in the case of downlink flow control. Such an indication to start/resume data transmission, for an upstream IAB node or downstream IAB node relative to the IAB node transmitting the HFCP message, may also be UE specific, UE's bearer specific, or IAB's bearer specific.

With respect to increasing the transmission data rate toward the receiver, in various examples, the transmitter LAB node may increase the data rate for a specific UE, a UE specific bearer, an IAB node specific bearer, a specific route, a specific upstream IAB node in the case of an uplink flow control, and/or a specific downstream IAB node in the case of a downlink flow control. Similarly, the transmitter IAB-donor may increase the data transmission rate for a specific UE, a UE specific bearer, an IAB node specific bearer, a specific route, and/or a specific downstream IAB node in the case of downlink flow control. Such an indication to increase data rate, for upstream IAB node or downstream IAB node relative to the IAB node transmitting the HFCP message, may also be UE specific, UE's bearer specific, or IAB's bearer specific. The amount of increase in data rate can be expressed as a percentage of the current data rate in the signaling, for example.

With respect to performing selection of a new route or new intermediary IAB node, in some cases, as a result of increase of data rate or decrease in data rate, the transmitter (e.g. IAB node or IAB donor node) performing the flow control, may perform route (re) selection.

The flow control notification message may be triggered periodically or by events. The following events may trigger the flow control notification message, presented by way of example and without limitation:

available capacity in the receiver buffer is above a threshold C1 available capacity in the receiver buffer is below a threshold C2 amount of data in the receiver buffer is below receiver buffer lower edge threshold B_L amount of data in the receiver buffer is above the receiver buffer upper edge threshold B_U Mobility events such as one or more of the following, presented by way of example and without limitation:

Mobility of the UE as a result of conditional handover or other UE controlled mobility events requiring the UE to trigger flow control. For example, at such an event, the UE may request the UE's access IAB node to stop downlink traffic or re-route downlink traffic through another IAB node.

Mobility of the IAB node (e.g., IAB MT node) as a result of conditional handover or other IAB node (e.g., AB MT node) controlled mobility events requiring the IAB node to trigger flow control. For example, at such an event, the IAB node may request upstream IAB node to stop downlink traffic or re-route. downlink traffic through another IAB node. Similarly, at such mobility event, the IAB node may request downstream IAB node to stop uplink traffic or re-route uplink traffic through another IAB node.

IAB node detects a failure for e.g. radio link failure toward the upstream IAB node or IAB-donor node. In such an event, the IAB node may initiate uplink flow control toward downstream IAB node. For e.g., the IAB node may request downstream IAB node to stop uplink traffic or re-route uplink traffic through another IAB node. Similarly, the IAB node may initiate downlink flow control toward upstream IAB node. For e.g., at detection of radio link failure toward Secondary Cell Group (SCG) cell, the IAB node may initiate flow control toward upstream IAB node.

IAB node detects failure of backhaul SCG cell. For example, at detection of such event, the IAB node may initiate downlink flow control toward upstream IAB node or IAB-donor. Similarly, this event may cause the IAB node to trigger uplink flow control toward downstream IAB node.

IAB node detects failure of access link SCG cell. For e.g. at detection of such event, the LAB node may initiate downlink flow control toward upstream IAB node or IAB-donor. Similarly, this event may cause the IAB node to trigger uplink flow control toward downstream IAB node.

Change or selection of new route. At selection of a new route, the IAB node may trigger downlink flow control toward an upstream transmitter IAB node or IAB-donor. Similarly, the IAB node may trigger uplink flow control toward downstream IAB node or the UE.

Upon expiry of flow control periodic timer.

Thus, as described above, an apparatus can receive a flow control feedback message from an intermediary node, wherein the intermediary node is connected between the apparatus and an end node uplink from the apparatus in the network, such that data sent to the apparatus from the end node travels through the intermediary node. Based on the flow control feedback message, the apparatus can send a flow control message to the end node or can select a new route for data to be sent downlink from the end node to the apparatus. The flow control feedback message may indicate an explicit flow control request, and the flow control message may include an indication for the end node to stop transmitting data, start transmitting data, increase its data transmission rate, decrease its data transmission rate, and/or transmit data at a new rate.

As also described above, an apparatus may receive a flow control notification message from an intermediary node, the intermediary node connected between the apparatus and an end node uplink from the apparatus in the network, such that data sent to the apparatus from the end node travels through the intermediary node. Based on the flow control notification message, the apparatus can send a flow control message to the end node. The flow control message may include an indication for the end node to stop transmitting data, start transmitting data, increase its data transmission rate, decrease its data transmission rate, and/or transmit data at a new rate. The flow control notification message may be received periodically. Alternatively, or additionally, the flow control notification message may be received, for example and without limitation, in response to an available capacity in the buffer of the intermediary node or end node being above a threshold, in response to an available capacity in a buffer of the intermediary node or end node being below a threshold, in response to an amount of data in a buffer of the intermediary node or end node being below a lower edge threshold, or in response to an amount of data in a buffer of the intermediary node or end node being above an upper edge threshold. The flow control notification message may indicate, for example and without limitation, an available capacity in a buffer of the intermediary node or end node, an amount of data in the buffer of the intermediary node or end node, an indication that the amount of data in the buffer of the intermediary node or end node is below a lower edge threshold, an indication that the amount of data in the buffer of the intermediary node or end is above an upper edge threshold, an identity of a bearer, and identity of a quality of service flow, an identity of the intermediary node for which flow control should be applied, an identity of a route for which flow control should be applied, or an indication of a packet missing from the intermediary node or end node.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 13A:
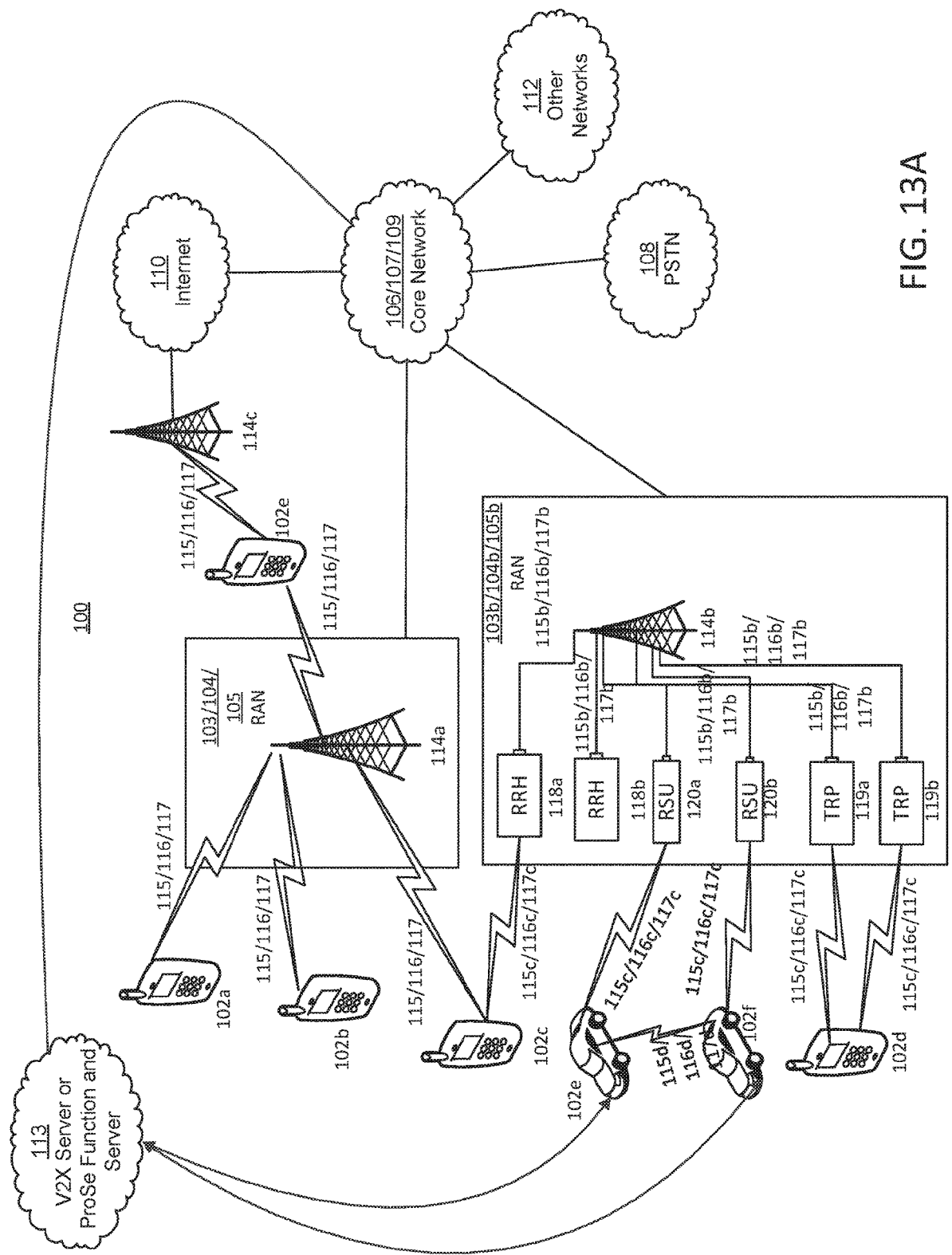
FIG. 13A illustrates an example communications system in which the methods and apparatuses described and claimed herein may be embodied.

FIG. 13A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, and/or 102f (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f may be any type of apparatus or device configured to operate and/or communicate in a wireless environment. Although each WTRU 102a, 102b, 102c, 102d, 102e is depicted in FIGS. 13A-13E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b, and/or RSUs (Roadside Units) 120a, 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a, 120b, may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b TRPs 119a, 119b, and/or RSUs 120, 120b may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, and/or 102f may communicate with one another over an air interface 115d/116d/117d, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b, and RSUs 120a, 120b in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/

116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b, and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 13A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VOIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 13A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 13A may be configured to communicate with the base station 114a, which may employ a cellular-based radio technology, and with the base station 114c, which may employ an IEEE 802 radio technology.

Figure 13B:
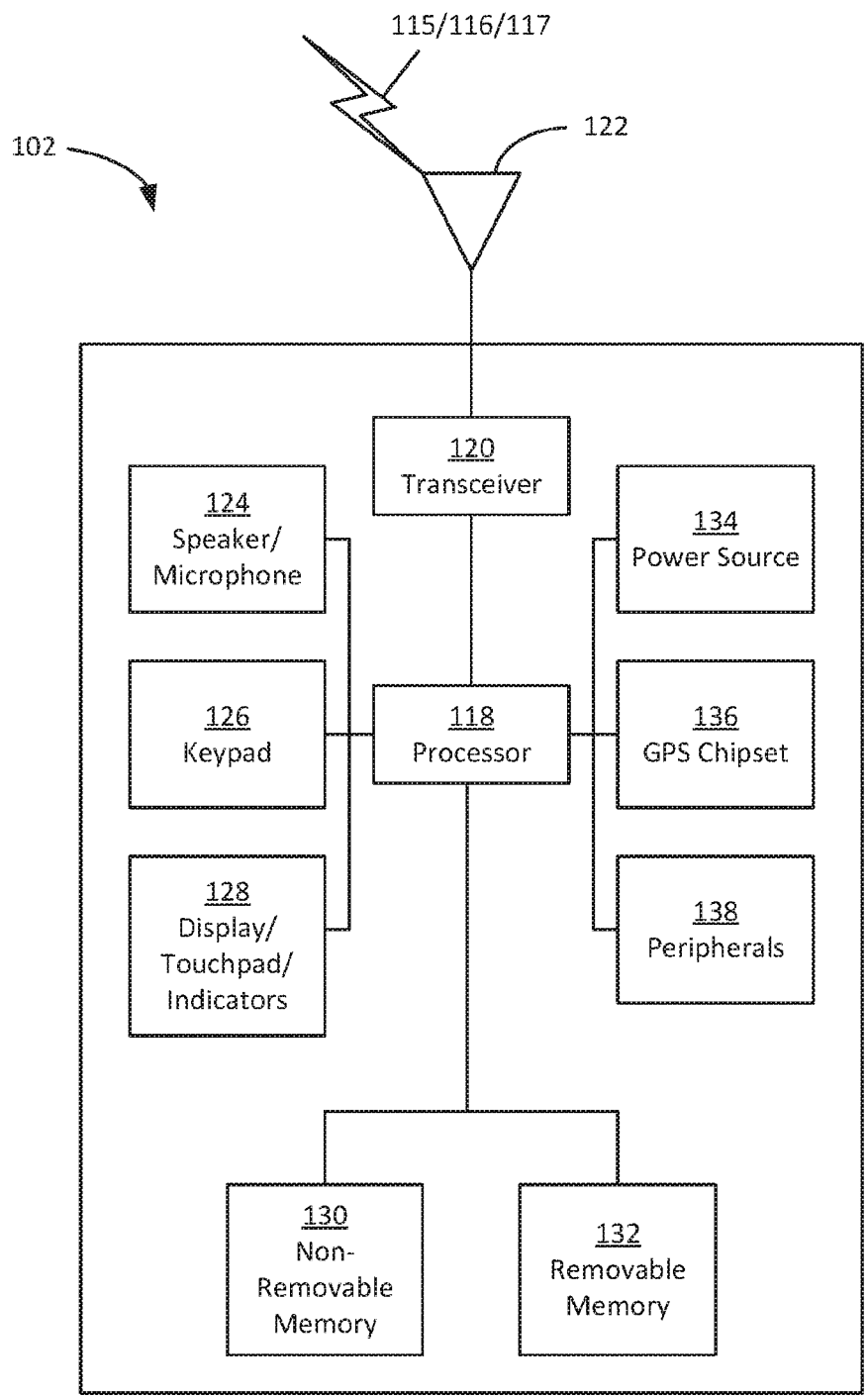
FIG. 13B is a block diagram of an example apparatus or device configured for wireless communications in accordance with the embodiments illustrated herein.

FIG. 13B is a block diagram of an example apparatus or device configured for wireless communications in accordance with the embodiments illustrated herein, such as for example, a WTRU 102. As shown in FIG. 13B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 13A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

FIG. 13B is a block diagram of an example apparatus or device configured for wireless communications in accordance with the embodiments illustrated herein, such as for example, a WTRU 102. As shown in FIG. 13B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 13C:
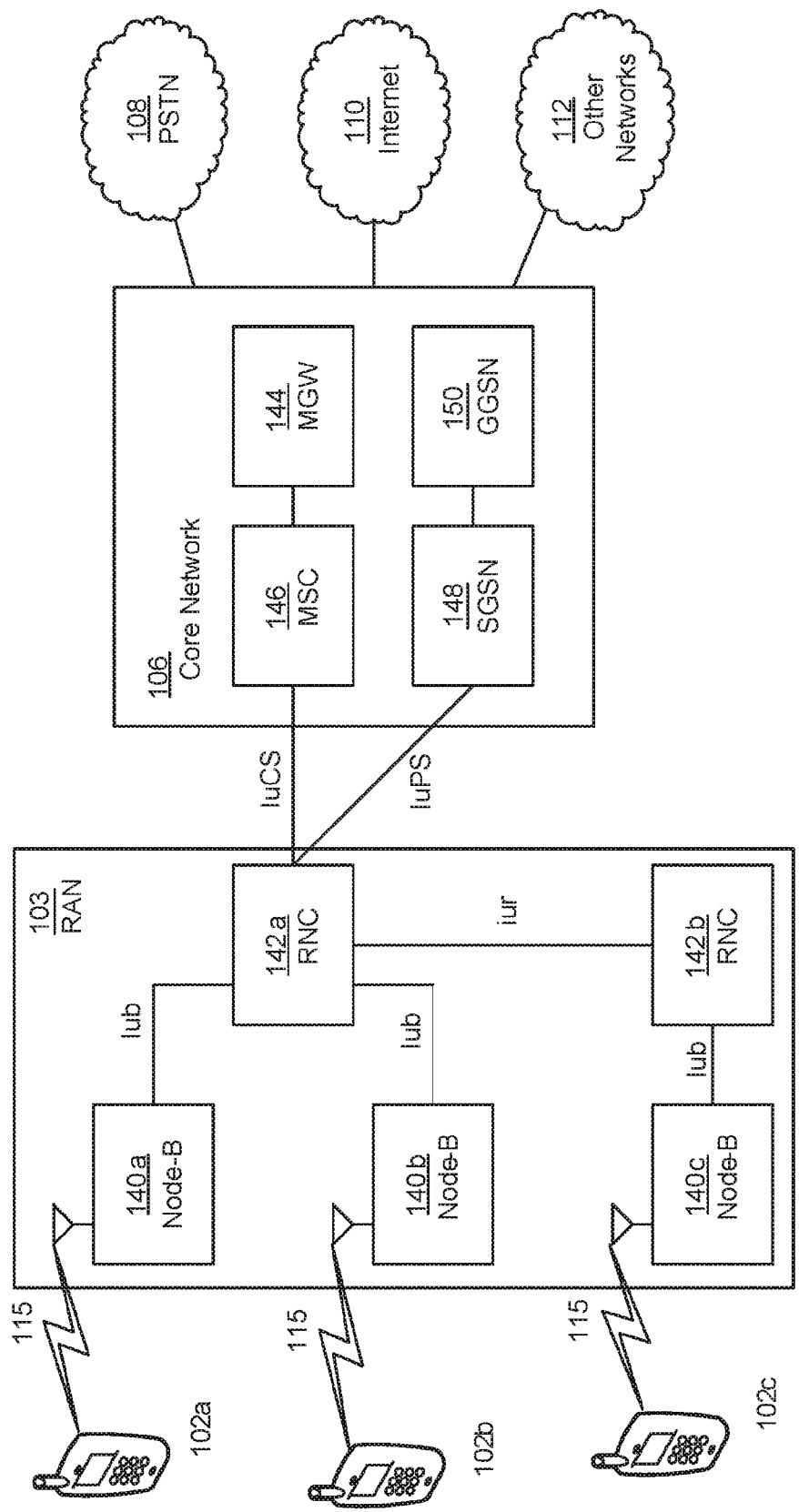
FIG. 13C is a system diagram of an example radio access network (RAN) and core network in accordance with an example embodiment.

FIG. 13C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
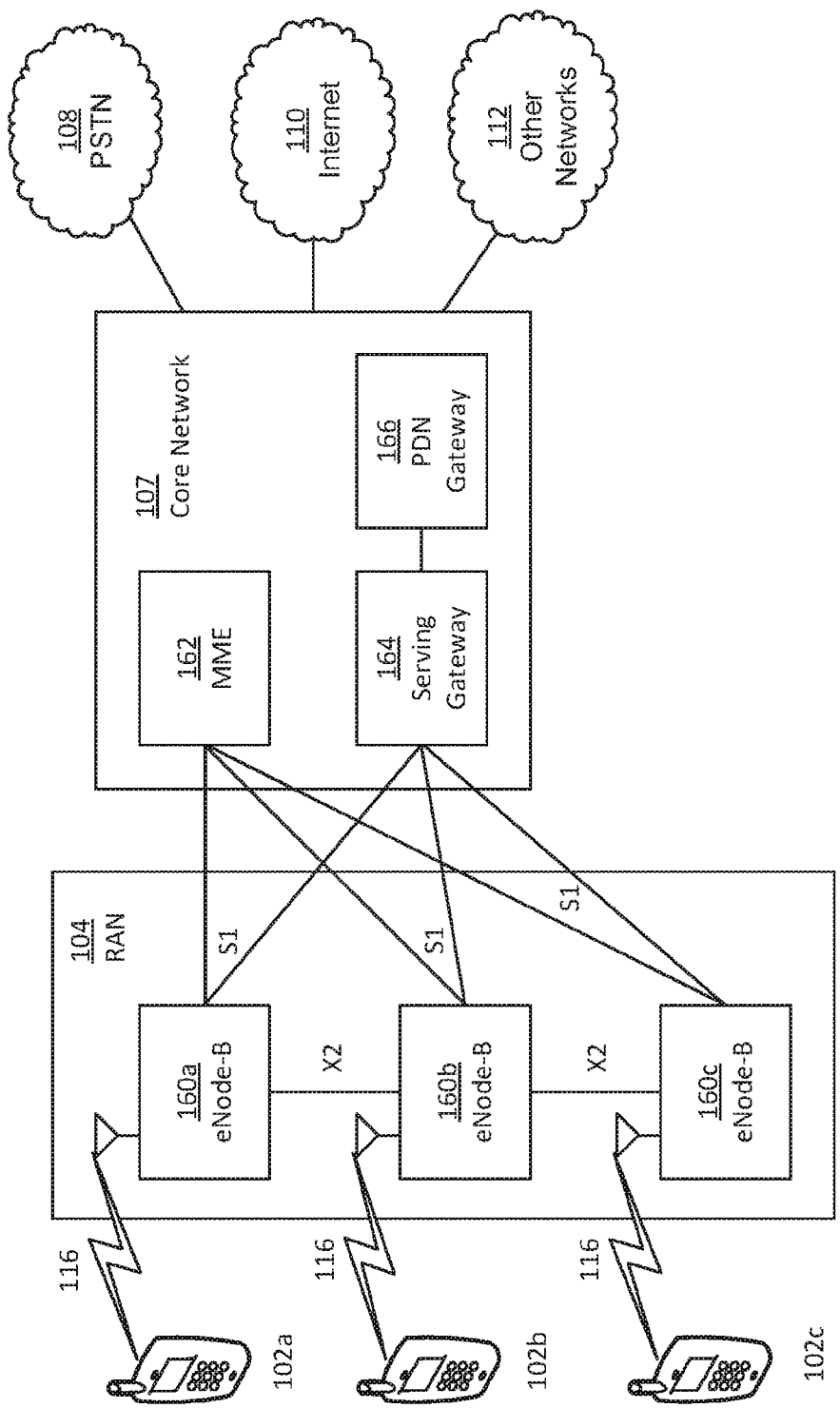
FIG. 13D is another system diagram of a RAN and core network according to another embodiment.

FIG. 13D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 107 shown in FIG. 13D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
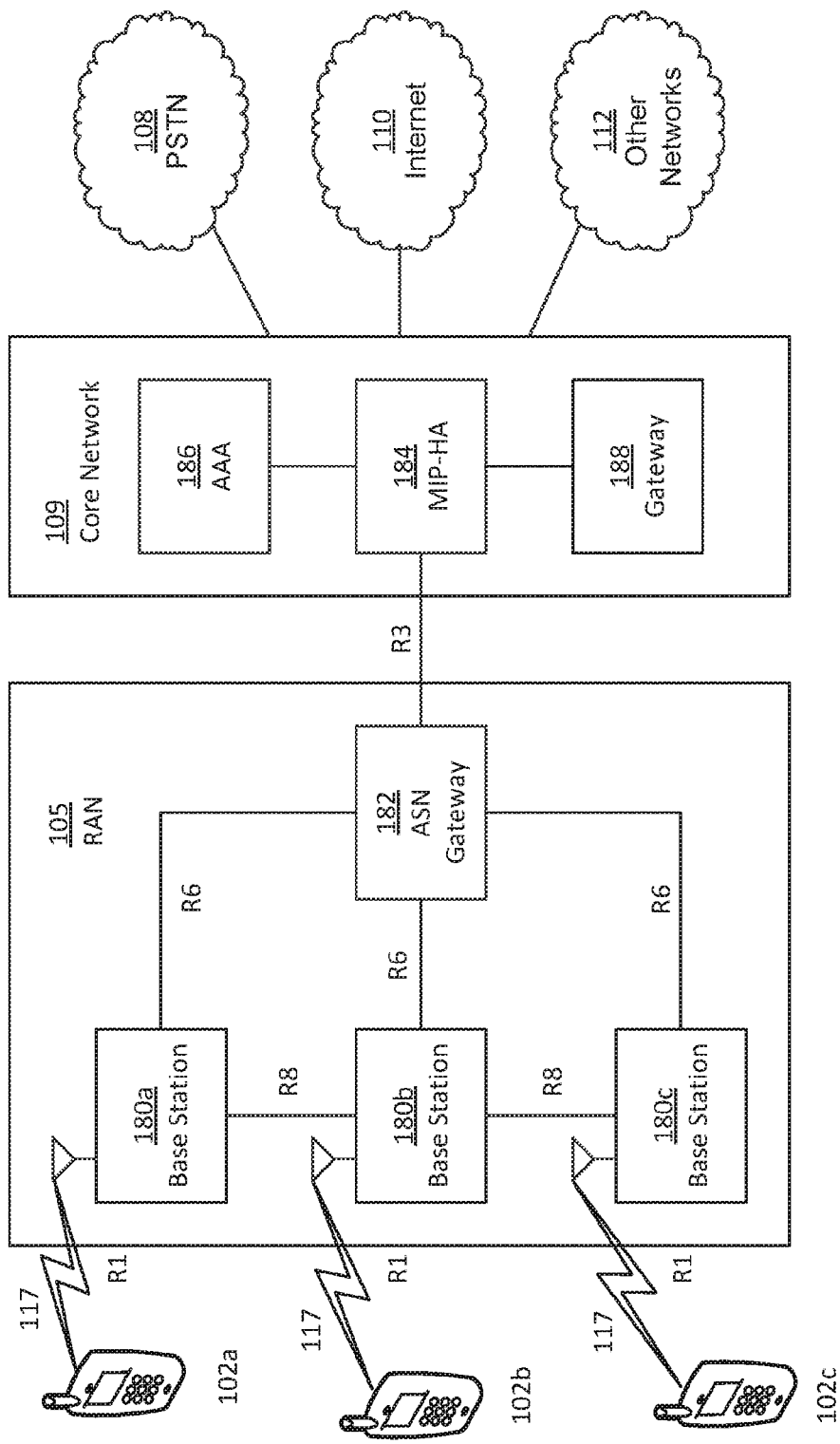
FIG. 13E is another system diagram of a RAN and core network according to another embodiment.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUS 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks The core network entities described herein and illustrated in FIGS. 13A, 13C, 13D, and 13E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 13A, 13B, 13C, 13D, and 13E are provided by way of example only, and it is understood that the subject matter disclosed and claimed herein may be embodied or implemented in any similar communication system, whether presently defined or defined in the future.

Figure 13F:
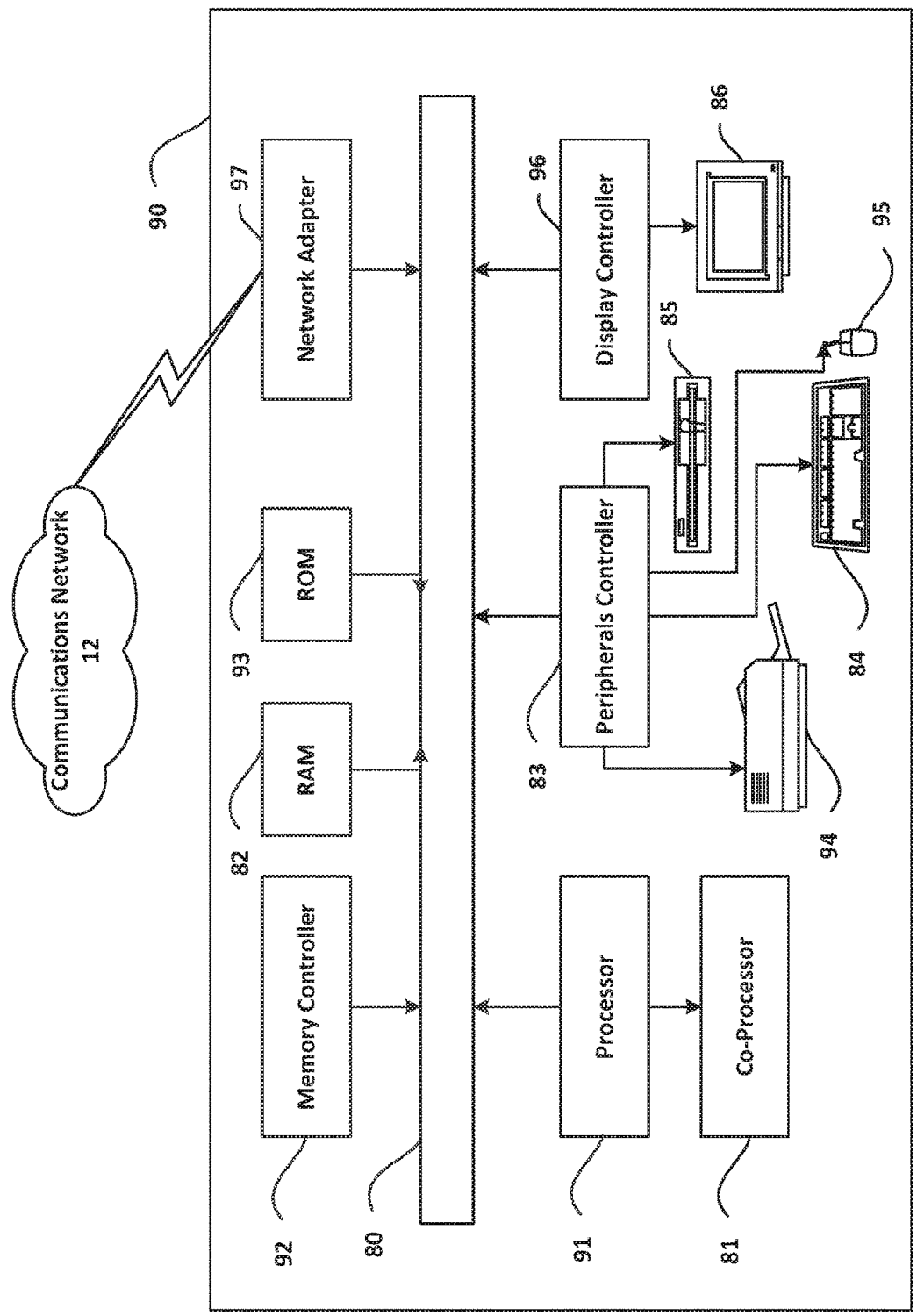
FIG. 13F is a block diagram of an exemplary computing system 90 in which one or more apparatuses of the communications networks illustrated in FIGS. 13A, 13C, 13D and 13E may be embodied.

FIG. 13F is a block diagram of an exemplary computing system 90 in which one or more apparatuses of the communications networks illustrated in FIGS. 13A, 13C, 13D and 13E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 13A, 13B, 13C, 13D, and 13E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 13G:
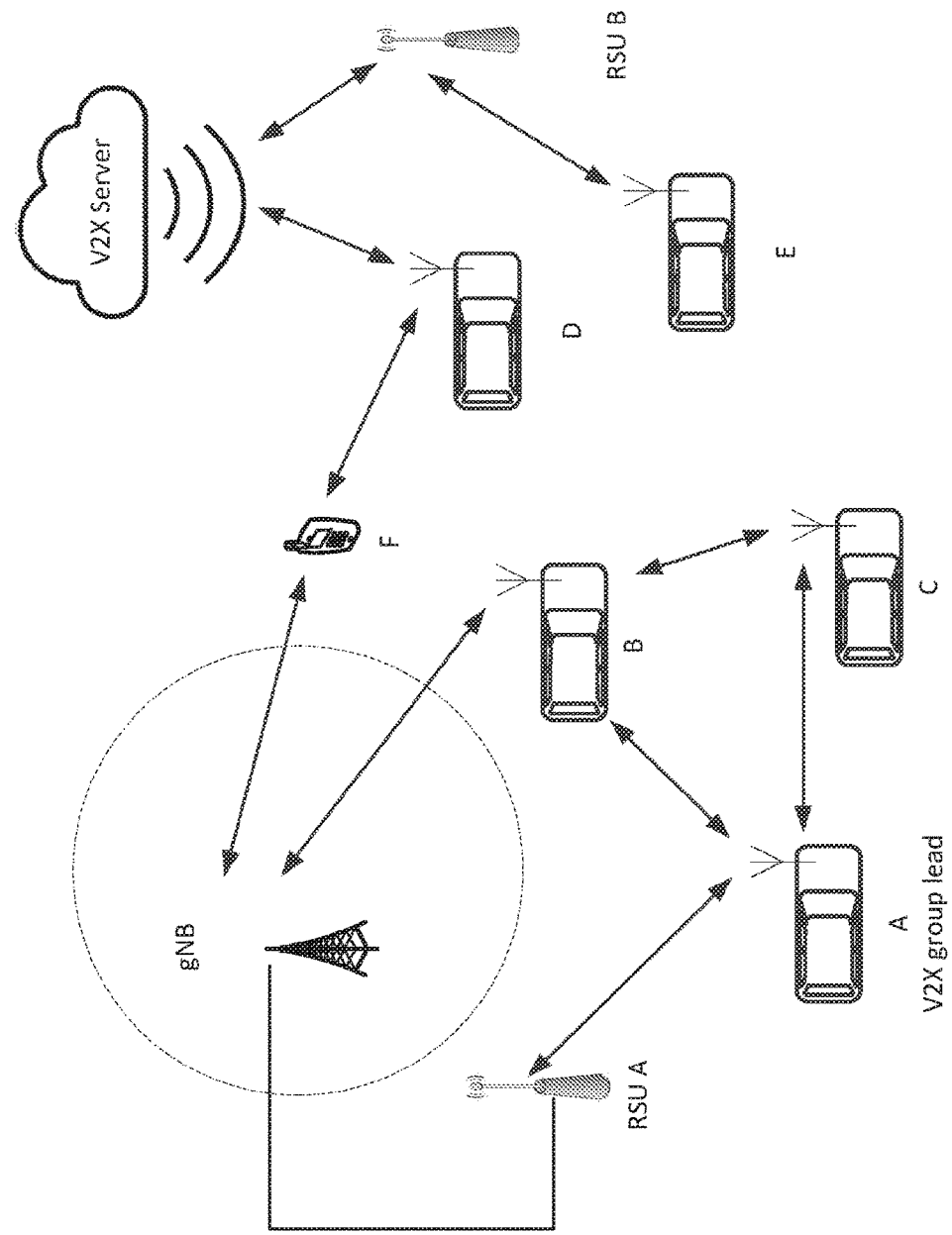
FIG. 13G illustrates another example communications system in which the methods and apparatuses described and claimed herein may be embodied.

FIG. 13G illustrates one embodiment of an example communications system 99 in which the methods and apparatuses described and claimed herein may be embodied. As shown, the example communications system 99 may include wireless transmit/receive units (WTRUS) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to NR technologies that may appear in the above description. Unless otherwise specified, the acronyms used herein refer to the corresponding term listed below.

5GC 5G Core Network
ACK Positive ACKnowledgment
AM Acknowledged Mode
Adapt Adaption Layer
BSR Buffer Status Report
CN Core Network
CU Central Unit
CU-CP Central Unit Control Plane
CU-UP Central Unit User Plane
DRB Data Radio Bearer
DU Distributed Unit
F1 F1 interface
F1AP F1 interface Application
gNB Node providing NR user plane and control plane
   protocol terminations towards the UE, and connected via the NG interface to the 5GC
HFCP Hop-by-hop Flow Control Protocol
IAB Integrated Access and Backhaul
IP Internet Protocol
L1 Layer 1
L2 Layer 2
MAC Medium Access Control
MT Mobile Termination
N1 N1 reference point
N3 N2 reference point
NACK Negative ACKnowledgment
NAS Non-Access Stratum
NG Next Generation or NG interface between 5G-C and RAN
NGAP NG Interface Application
NG-AP NG Interface Application
NG-C NG Control Plane interface
NG Interface Interface between NG RAN and 5GC
NG-RAN NG RAN
NG-U NG User Plane Interface
NR NR Radio Access
PDCP Packet Data Convergence Protocol
PDU Protocol Data Unit
PHY Physical Layer
QoS Quality of Service
RAN Radio Access Network
RB Radio Bearer
RLC Radio Link Control
RRC Radio Resource Control
SCG Secondary Cell Group
SDAP Service Data Adaption Layer
SDRAM Synchronous Dynamic Random Access Memory
SRB Signalling Radio Bearer
STCP Stream Control Transmission Protocol
UE User Equipment
UM Unacknowledged Mode
Un Un interface
Uu Uu interface This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wireless/transmit receive unit (WTRU) comprising:
a transceiver and one or more processors, the transceiver and the one or more processor being configured to:
receive flow control information from an Integrated Access and Backhaul (IAB) node, wherein the WTRU is communicating with a node in a network via the IAB node, and wherein the flow control information comprises an indication of an available size of a buffer of the IAB node and a routing identifier associated with the route for which flow control should be applied, wherein the route indicates a specific data path between the IAB and the WTRU, wherein the flow control is specified at a packet data convergence protocol (PDCP) layer in at least a form of an explicit flow control notification message, wherein the explicit flow control notification message indicates at least one of, a stop data transmission, a start data transmission, an increase data transmission rate, a decrease data transmission rate, a bearer identification (ID), a quality of service (QOS) flow ID, or a new data rate;
determine a flow control action based on a comparison between the available size of the buffer and a buffer capacity threshold that is associated with the routing identifier;
determine an amount of data for transmission, wherein the amount of data for transmission is based on the flow control information and the flow control action; and
send, to the IAB node, a data transmission, wherein the data transmission comprises the amount of data for transmission determined based on the flow control information and the flow control action.

2. The WTRU of claim 1, wherein the flow control information indicates that the amount of data in the buffer of the IAB node is above an upper edge threshold.

3. The WTRU of claim 1, wherein the flow control information indicates an identity of a bearer for which flow control should be applied.

4. The WTRU of claim 1, wherein the flow control information is received periodically.

5. The WTRU of claim 1, wherein the flow control information indicates that an available capacity in the buffer of the IAB node is below a threshold.

6. The WTRU of claim 1, wherein the flow control information indicates that the amount of data in the buffer of the IAB node is below a lower edge threshold.

7. The WTRU of claim 1, wherein the flow control information indicates a change of route or a selection of new route between the IAB node and the node.

8. The WTRU of claim 1, wherein the flow control information is included in a packet data convergence protocol (PDCP) protocol data unit (PDU).

9. A method for use in a wireless/transmit receive unit (WTRU), the method comprising:
receiving flow control information from an Integrated Access and Backhaul (IAB) node, wherein the WTRU is communicating with a node in a network via the IAB node, and wherein the flow control information comprises an indication of an available size of a buffer of the IAB node and a routing identifier associated with the route for which flow control should be applied, wherein the route indicates a specific data path between the LAB and the WTRU, wherein the flow control is specified at a packet data convergence protocol (PDCP) layer in at least a form of an explicit flow control notification message, wherein the explicit flow control notification message indicates at least one of, a stop data transmission, a start data transmission, an increase data transmission rate, a decrease data transmission rate, a bearer identification (ID), a quality of service (QOS) flow ID, or a new data rate;
determining a flow control action based on a comparison between the available size of the buffer and a buffer capacity threshold that is associated with the routing identifier;
determining an amount of data for transmission, wherein the amount of data for transmission is based on the flow control information and the flow control action; and
sending, to the IAB node, a data transmission, wherein the data transmission comprises the amount of data for transmission determined based on the flow control information and the flow control action.

10. The method of claim 9, wherein the flow control information indicates that the amount of data in the buffer of the IAB node is above an upper edge threshold.

11. The method of claim 9, wherein the flow control information indicates an identity of a bearer for which flow control should be applied.

12. The method of claim 9, wherein the flow control information is received periodically.

13. The method of claim 9, wherein the flow control information indicates that an available capacity in the buffer of the IAB node is below a threshold.

14. The method of claim 9, wherein the flow control information indicates that the amount of data in the buffer of the IAB node is below a lower edge threshold.

15. The method of claim 9, wherein the flow control information indicates a change of route or a selection of new route between the IAB node and the node.

16. The method of claim 9, wherein the flow control information is included in a packet data convergence protocol (PDCP) protocol data unit (PDU).

17. An apparatus comprising a transceiver and one or more processors,
the apparatus configured to:
send flow control information to a wireless transmit/receive unit (WTRU), wherein the apparatus is configured to communicate with the WTRU in a network, wherein data is sent via the apparatus from the WTRU to a node in the network, wherein the flow control information comprises an indication of an available size of a buffer of the apparatus and a routing identifier associated with the route for which flow control should be applied, wherein the flow control is specified at a packet data convergence protocol (PDCP) layer in at least a form of an explicit flow control notification message, wherein the explicit flow control notification message indicates at least one of, a stop data transmission, a start data transmission, an increase data transmission rate, a decrease data transmission rate, a bearer identification (ID), a quality of service (QOS) flow ID, or a new data rate;
wherein the flow control information is configured to enable the WTRU to determine a flow control action based on a comparison between the available size of the buffer and a buffer capacity threshold that is associated with the routing identifier; and
to determine an amount of data for transmission, wherein the amount of data for transmission is based on the flow control information and the flow control action; and
receive, from the WTRU, a data transmission, wherein the data transmission comprises the amount of data for transmission determined based on the flow control information and the flow control action.

18. The apparatus of claim 17, wherein the flow control information indicates at least one of an identity of a bearer or an identity of a route for which flow control should be applied.

* * * * *